J. W. BRYCE.
CALCULATING MACHINE.
APPLICATION FILED JULY 31, 1915.

1,267,510.

Patented May 28, 1918.
18 SHEETS—SHEET 1.

James W. Bryce, INVENTOR

BY Kerr, Page, Cooper & Hayward,
his ATTORNEYS

J. W. BRYCE.
CALCULATING MACHINE.
APPLICATION FILED JULY 31, 1915.

1,267,510.

Patented May 28, 1918.
18 SHEETS—SHEET 3.

James W. Bryce,
INVENTOR.

BY Kerr, Page, Cooper
& Hayward,
his ATTORNEYS.

J. W. BRYCE.
CALCULATING MACHINE.
APPLICATION FILED JULY 31, 1915.

1,267,510.

Patented May 28, 1918.
18 SHEETS—SHEET 4.

James W. Bryce,
INVENTOR.

BY Kerr, Page, Cooper
& Hayward
his ATTORNEYS.

J. W. BRYCE.
CALCULATING MACHINE.
APPLICATION FILED JULY 31, 1915.

1,267,510.

Patented May 28, 1918.
18 SHEETS—SHEET 5.

James W. Bryce, INVENTOR.

BY Kerr, Page, Cooper
& Hayward
his ATTORNEYS

J. W. BRYCE.
CALCULATING MACHINE.
APPLICATION FILED JULY 31, 1915.
1,267,510.
Patented May 28, 1918.
18 SHEETS—SHEET 6.
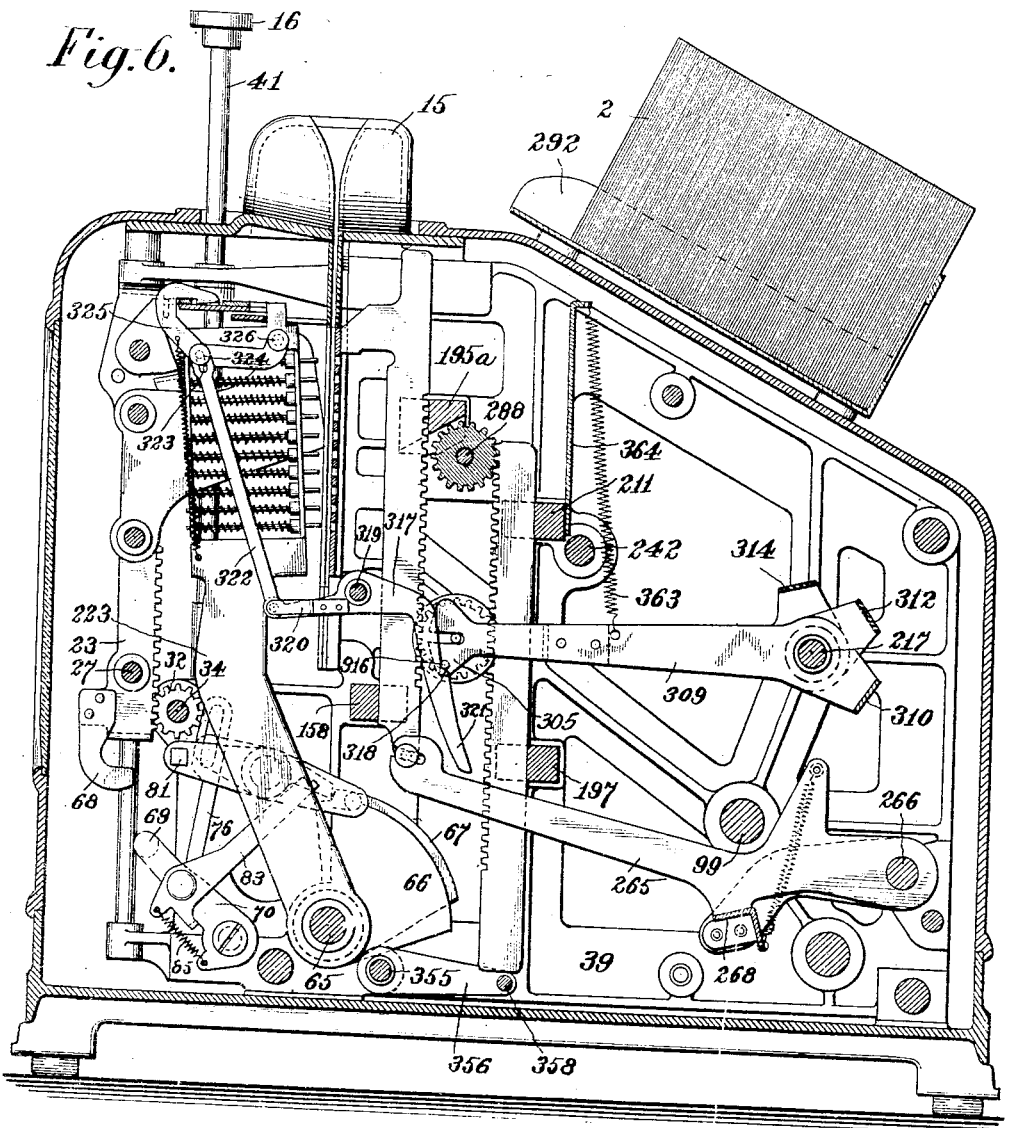
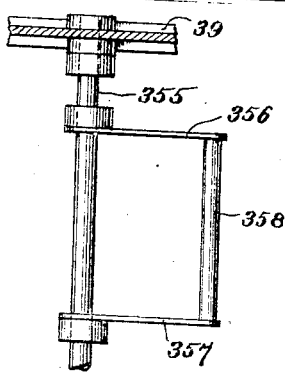
James W. Bryce, INVENTOR.
BY Kerr, Page, Cooper & Hayward
his ATTORNEYS

J. W. BRYCE.
CALCULATING MACHINE.
APPLICATION FILED JULY 31, 1915.

1,267,510.

Patented May 28, 1918.
18 SHEETS—SHEET 7.

J. W. BRYCE.
CALCULATING MACHINE.
APPLICATION FILED JULY 31, 1915.

1,267,510.

Patented May 28, 1918.
18 SHEETS—SHEET 8.

James W. Bryce,
INVENTOR.

BY Kerr, Page, Cooper
& Hayward,
ATTORNEYS

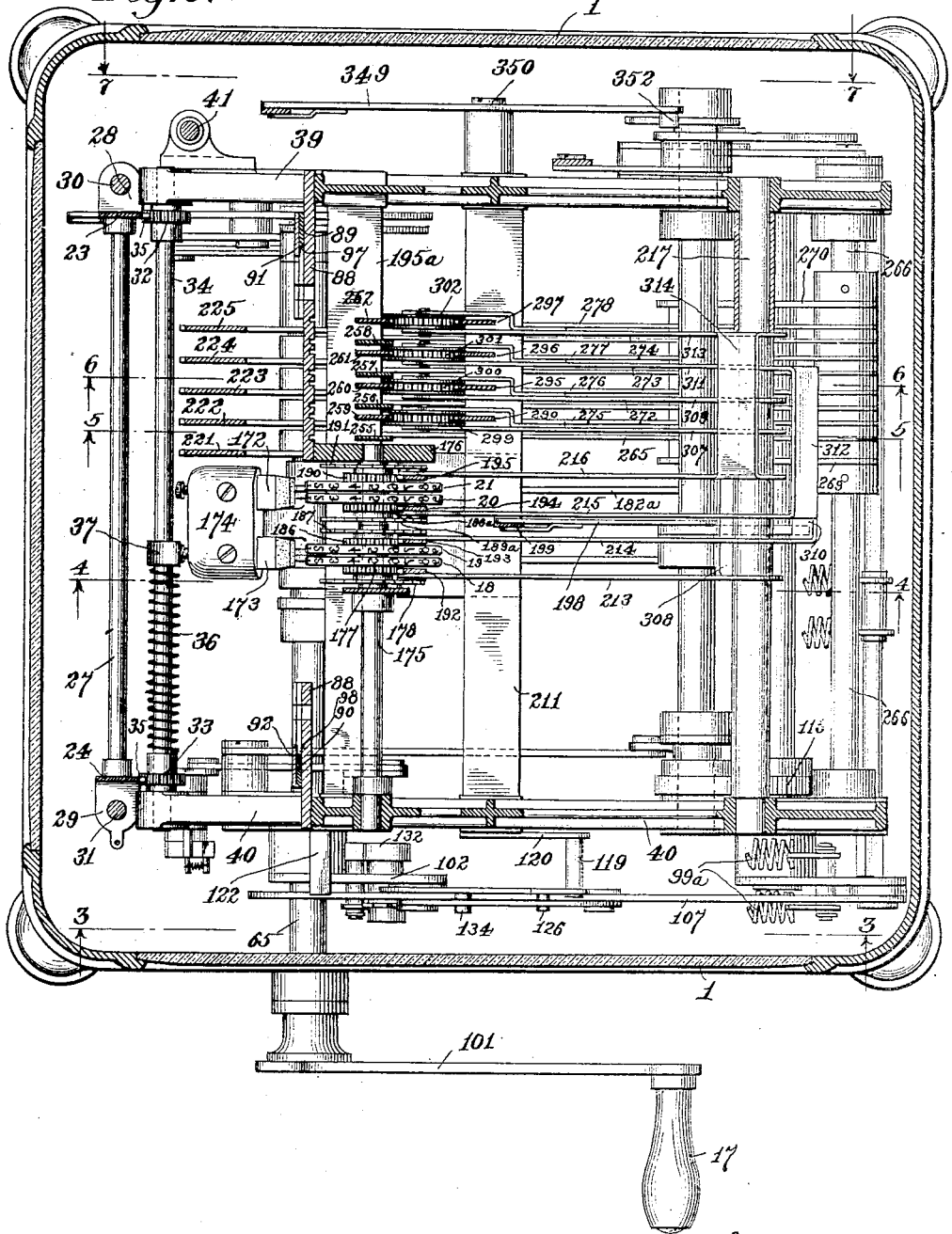

J. W. BRYCE.
CALCULATING MACHINE.
APPLICATION FILED JULY 31, 1915.
1,267,510.
Patented May 28, 1918.
18 SHEETS—SHEET 10.
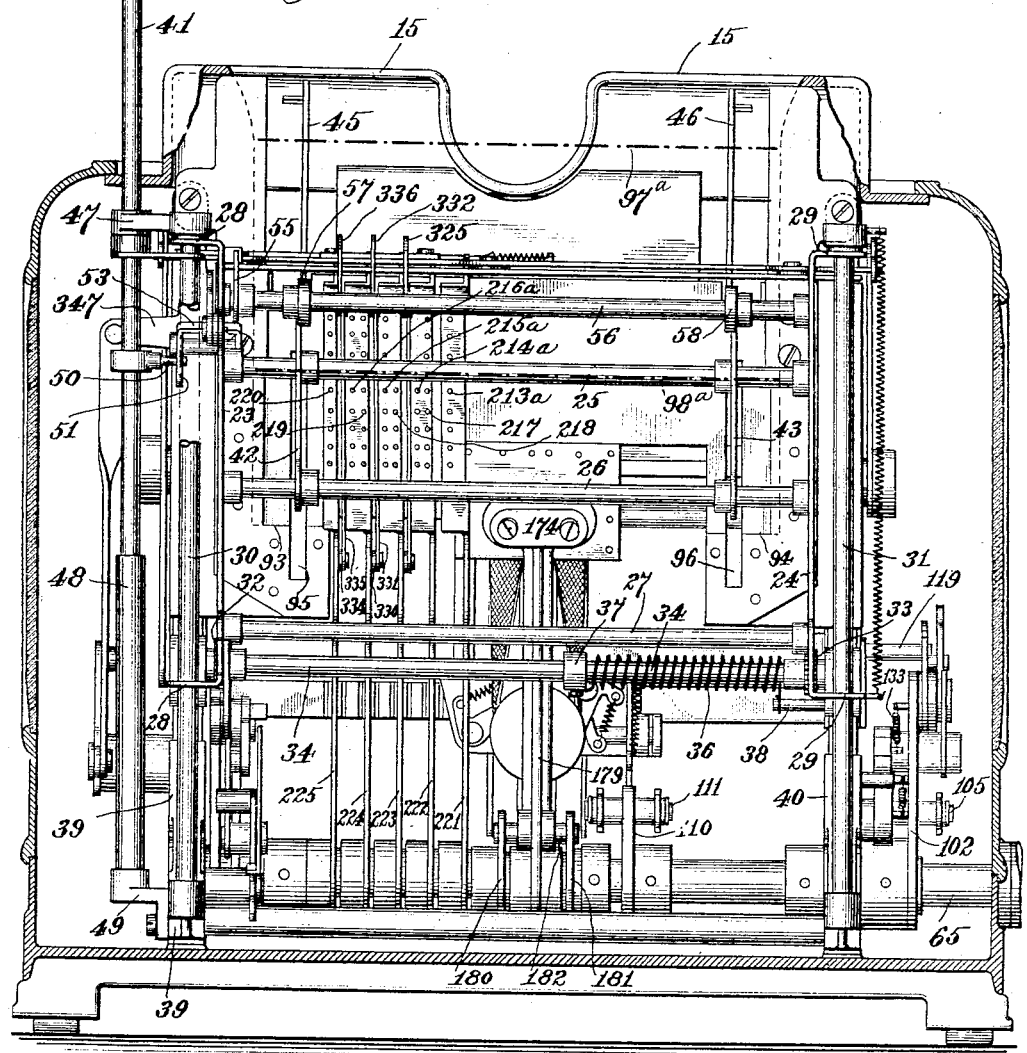
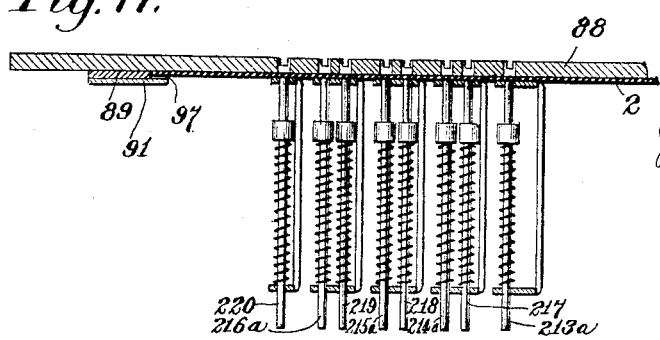
James W. Bryce,
INVENTOR
BY Kerr, Page, Cooper
& Hayward,
his ATTORNEYS

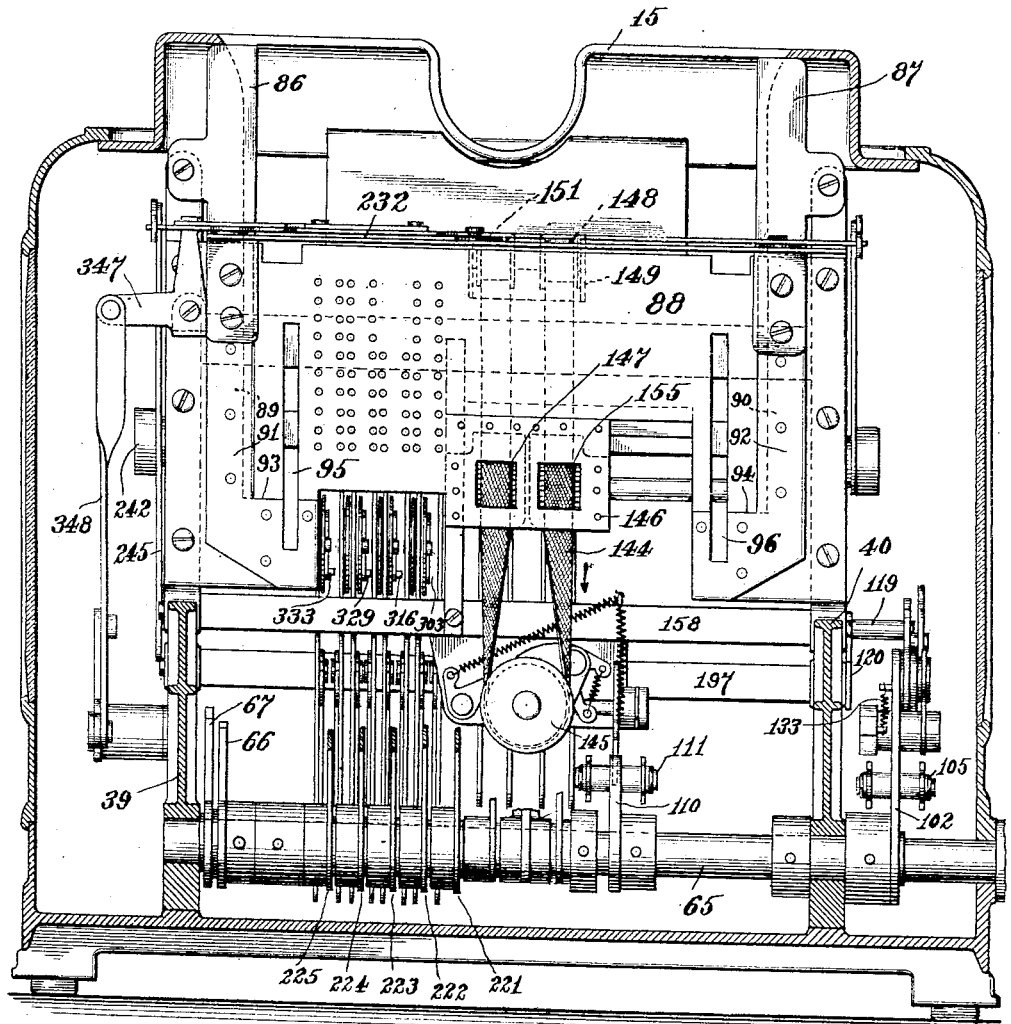

J. W. BRYCE.
CALCULATING MACHINE.
APPLICATION FILED JULY 31, 1915.

1,267,510.

Patented May 28, 1918.
18 SHEETS—SHEET 13.

James W. Bryce, INVENTOR

BY Kerry Page, Cooper
& Hayward,
his ATTORNEYS

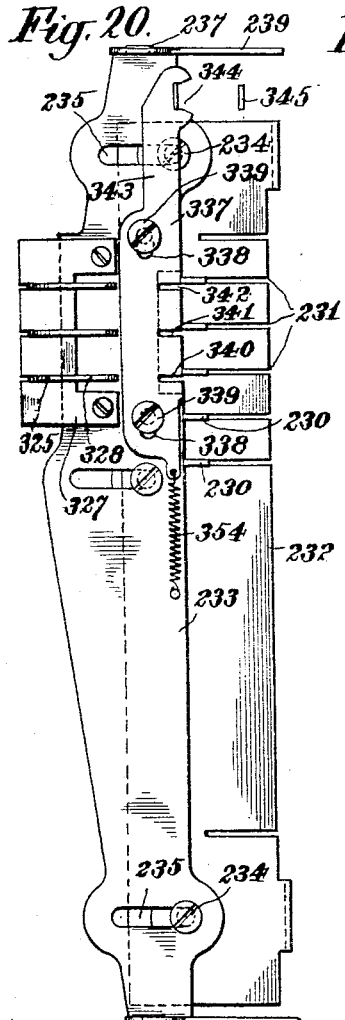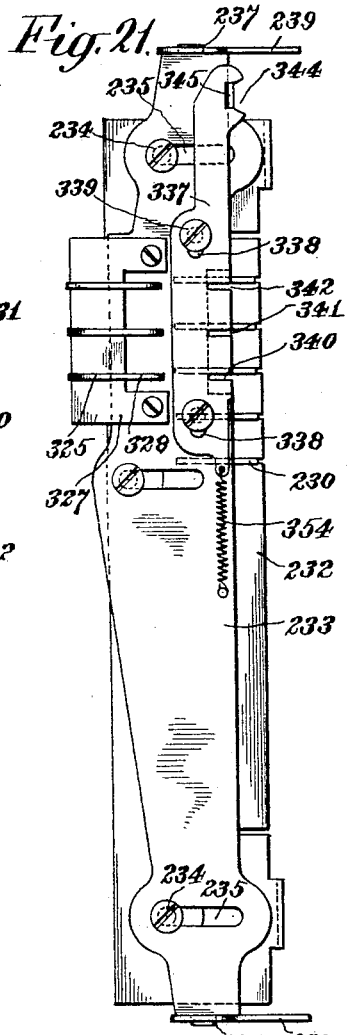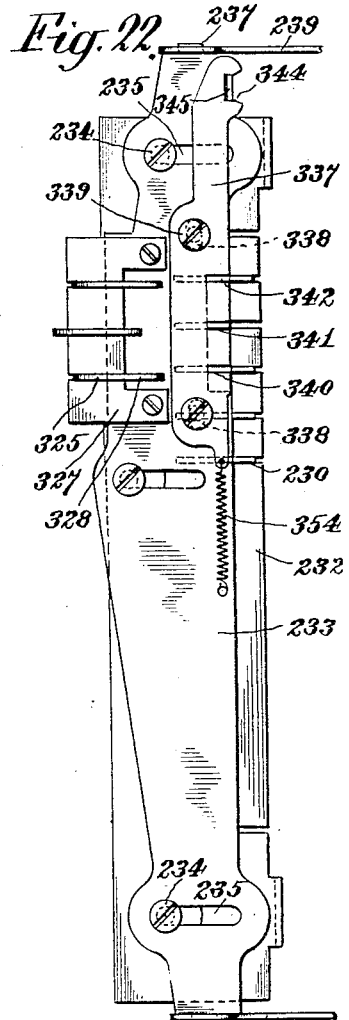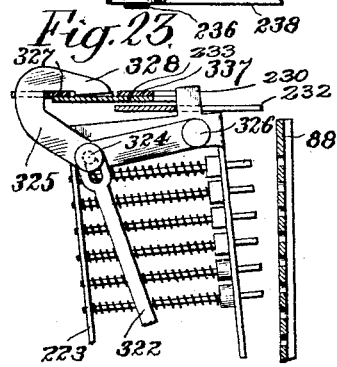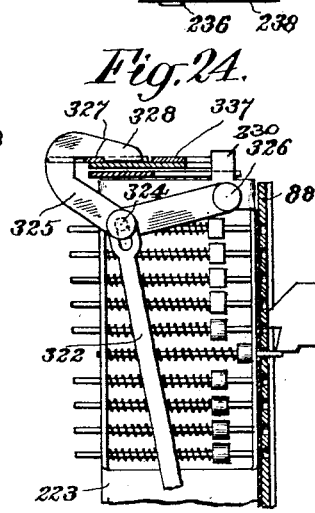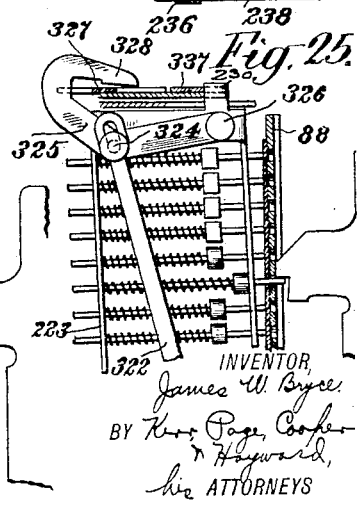

J. W. BRYCE.
CALCULATING MACHINE.
APPLICATION FILED JULY 31, 1915.
1,267,510.
Patented May 28, 1918.
18 SHEETS—SHEET 15.
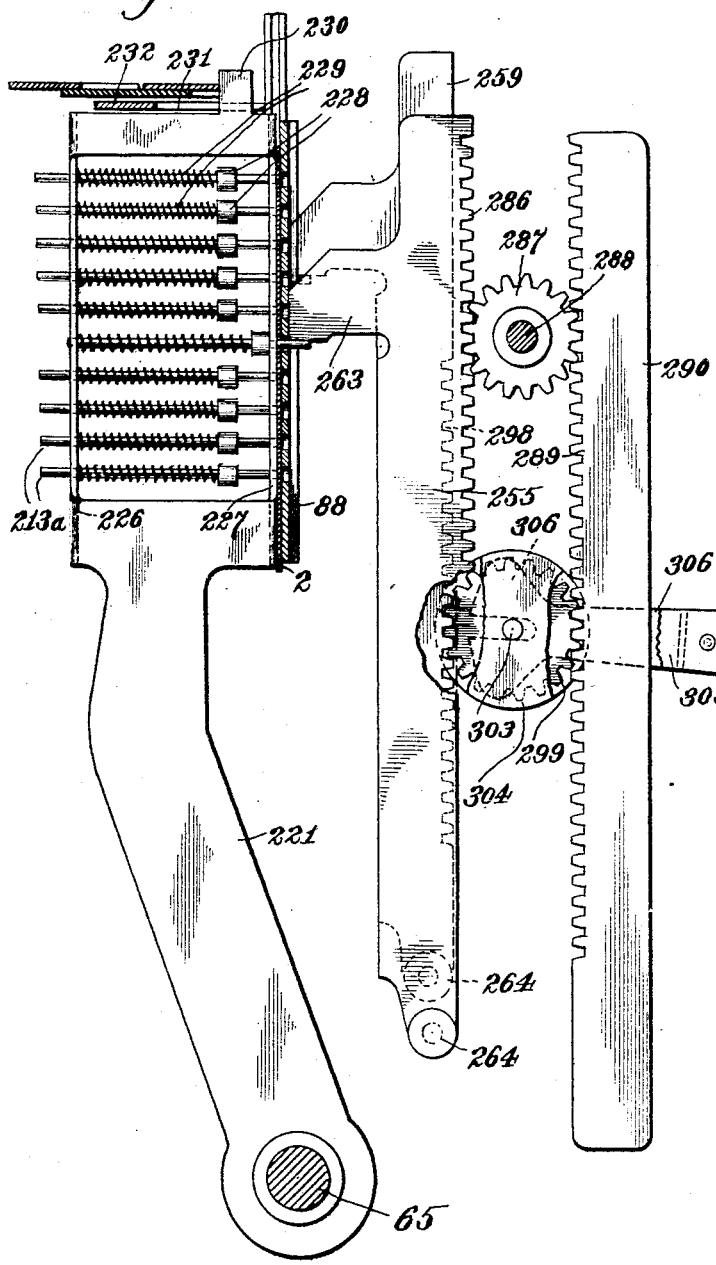
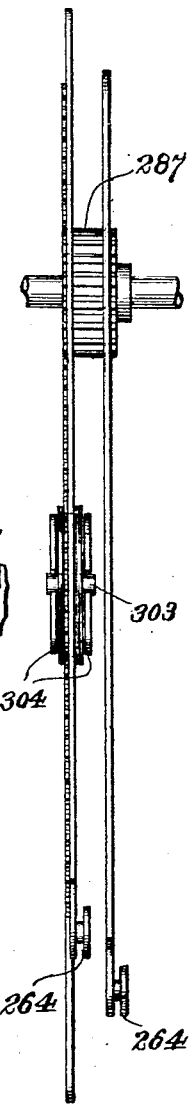
James W. Bryce, INVENTOR
BY Kerr, Page, Cooper & Hayward,
his ATTORNEYS J. W. BRYCE.
CALCULATING MACHINE.
APPLICATION FILED JULY 31, 1915.
1,267,510.
Patented May 28, 1918.
18 SHEETS—SHEET 16.
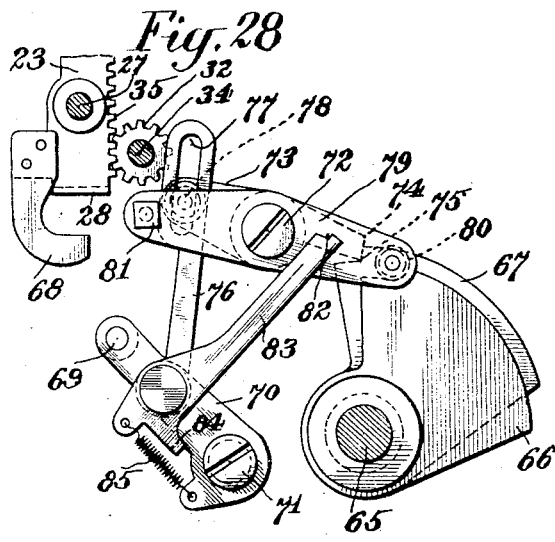
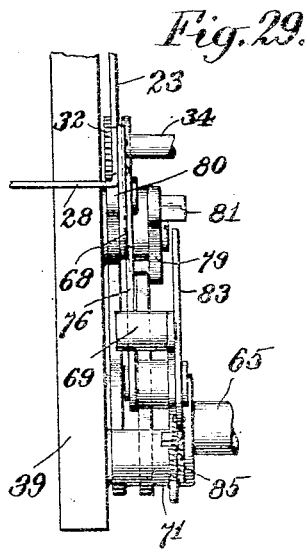
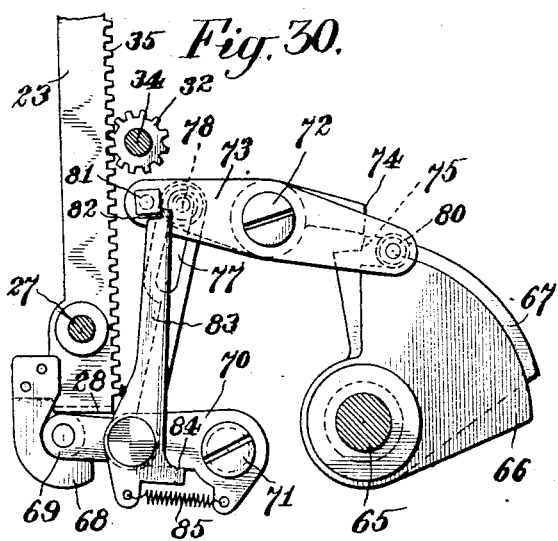
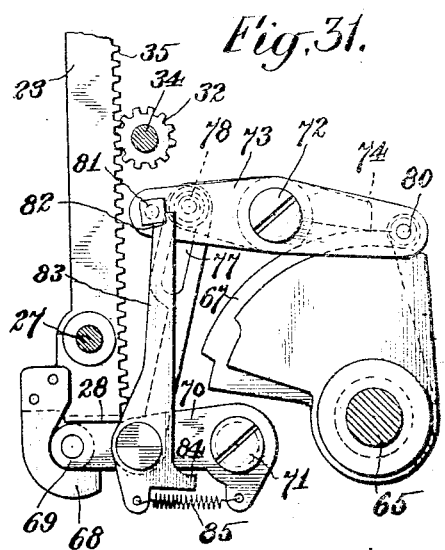
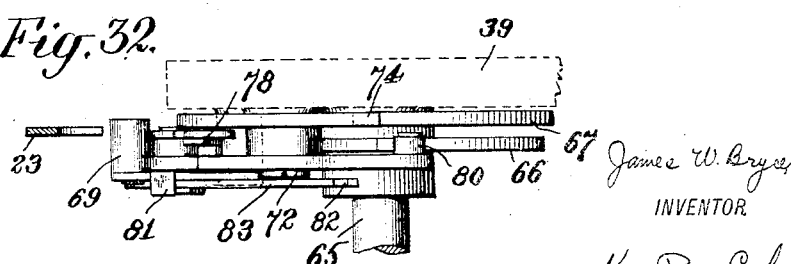
James W. Bryce,
INVENTOR.
BY Kerr, Page, Cooper
& Hayward,
his ATTORNEYS J. W. BRYCE.
CALCULATING MACHINE.
APPLICATION FILED JULY 31, 1915.
1,267,510.
Patented May 28, 1918.
18 SHEETS—SHEET 17.
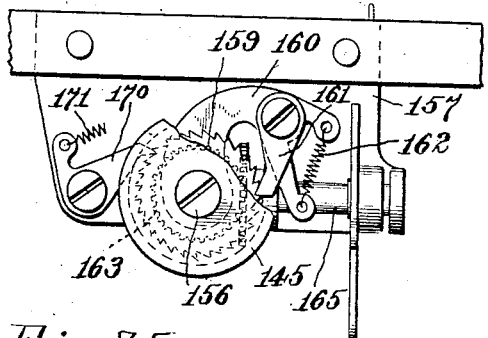
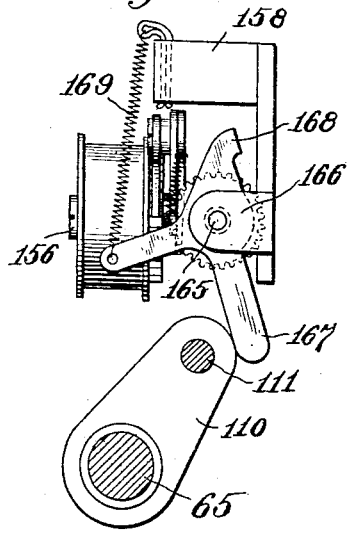
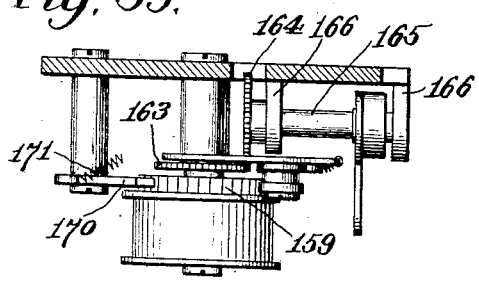
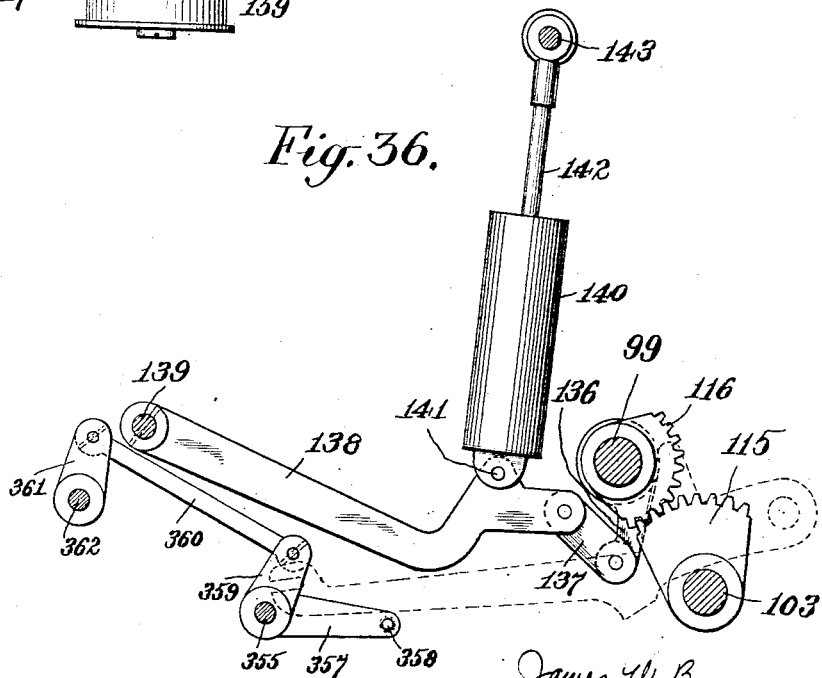
James W. Bryce, INVENTOR.
BY Kerr, Page, Cooper
& Hayward,
his ATTORNEYS

J. W. BRYCE.
CALCULATING MACHINE.
APPLICATION FILED JULY 31, 1915.

1,267,510.

Patented May 28, 1918.
18 SHEETS—SHEET 18.

James W. Bryce,
INVENTOR.

BY Kerry Page Cooper
& Hayward,
his ATTORNEYS

UNITED STATES PATENT OFFICE.

JAMES W. BRYCE, OF BROOKLYN, NEW YORK, ASSIGNOR TO INTERNATIONAL TIME RECORDING COMPANY OF NEW YORK, OF ENDICOTT, NEW YORK, A CORPORATION OF NEW YORK.

CALCULATING-MACHINE.

1,267,510.      Specification of Letters Patent.      Patented May 28, 1918.

Application filed July 31, 1915. Serial No. 43,024.

*To all whom it may concern:*

Be it known that I, JAMES W. BRYCE, a citizen of the United States, residing at Brooklyn, in the county of Kings and State of New York, have invented certain new and useful Improvements in Calculating-Machines, of which the following is a full, clear, and exact description.

The invention forming the subject of this application resides in what is known as an office or integrating machine, which is designed to operate on a card suitably punched in positions which indicate two points of time, for instance, the beginning and the ending of any piece of shop work, and which calculates the elapsed time between such operations and prints it at a selected point on the card. As the machine is not intended to be operated by the workman, but to determine and record certain dates obtainable from data which have been printed and punched by the workman, its construction is such as a more intelligent clerk or operator may be safely entrusted to handle without error.

The improvements reside in this construction and constitute a new and useful piece of mechanism for the purpose for which it is intended, the nature of the improvements being best defined by the detailed description of the mechanism by reference to the drawings which follow:

In the said drawings:—

Fig. 6, is a sectional elevation taken on the line 6—6 of Fig. 9.

Fig. 9, is a horizontal section taken on the line 9—9 of Fig. 4.

Fig. 10, is a front elevation of the mechanism.

Fig. 11, is a transverse section on the line 11—11 of Fig. 5.

Fig. 15, is a detail horizontal section showing the cut out universal bar.

Fig. 17, is a detail horizontal section of the rack guide plate and the pin boxes.

Fig. 20, is a plan view of a portion of the subtracting mechanism, in normal position.

Fig. 21, is a view similar to Fig. 20 with the parts in a position ready to subtract.

Fig. 22, is a view similar to Figs. 20 and 21, with the parts in a position of having subtracted in one column.

Figs. 23, 24 and 25 are detail sectional elevations of the parts shown in Figs. 20, 21 and 22 and with the parts in similar corresponding positions.

Fig. 26, is a detail view of one of the pin boxes and its associated racks and differential.

Fig. 27, is a front view of the parts shown in Fig. 26.

Fig. 28, is a detail view showing a portion of the card receiver carriage and the justifying mechanism which controls it.

Fig. 29, is a front view of the parts shown in Fig. 28.

Fig. 30, is a view similar to Fig. 28, but with the card receiver carriage depressed.

Fig. 31, is a view similar to Figs. 28 and 30, but with the card receiver carriage in its justified position.

Fig. 32, is a top view of the parts shown in Fig 28.

Fig. 33, is a front view of the mechanism which moves the ink ribbon step by step.

Fig. 34, is a side view of the parts shown in Fig. 33.

Fig. 35, is a top view of the parts shown in Fig. 33.

Fig. 36, is a detail showing the oil dash pot.

Figure 1:
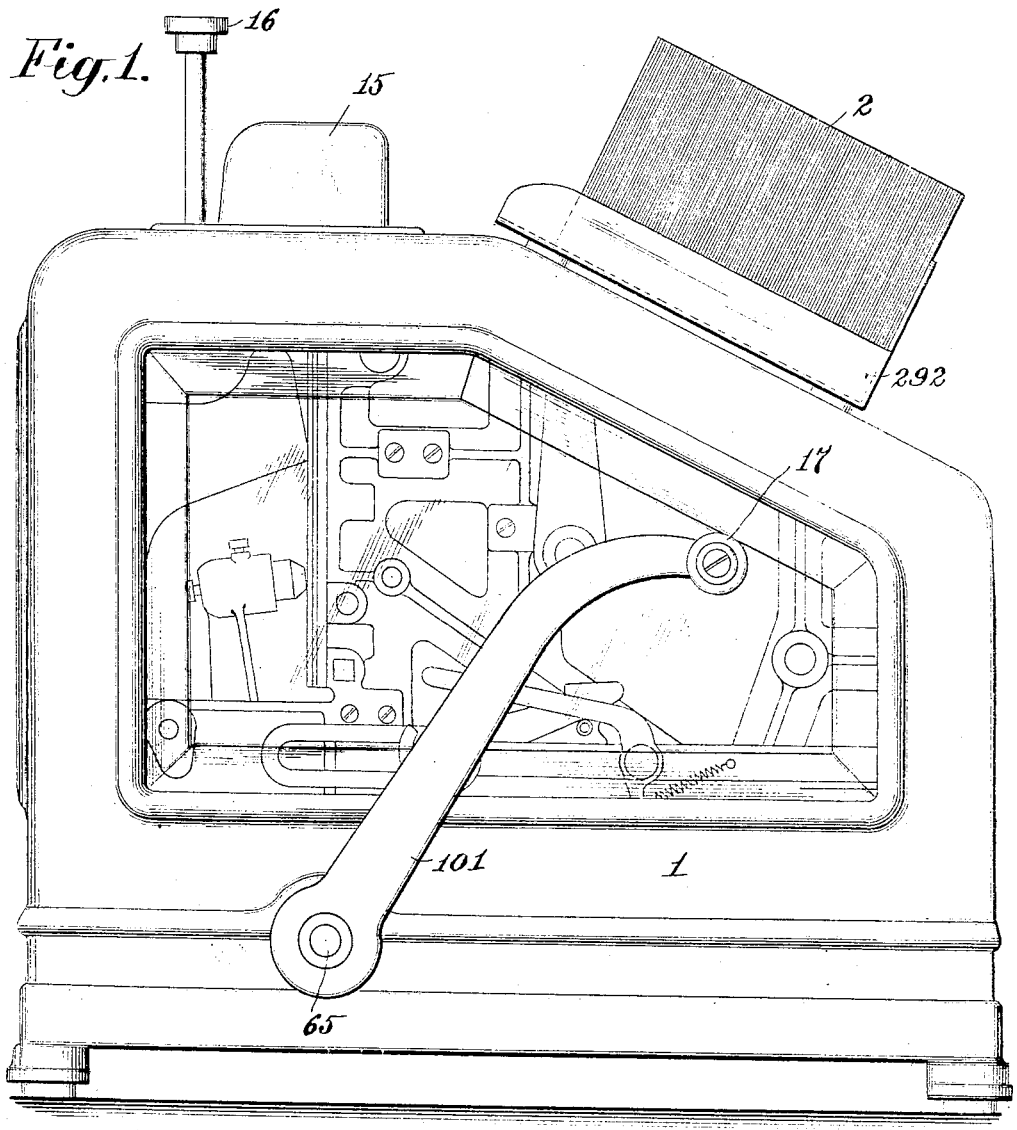
Figure 1, is a side elevation of a machine embodying my invention.
Figure 2:
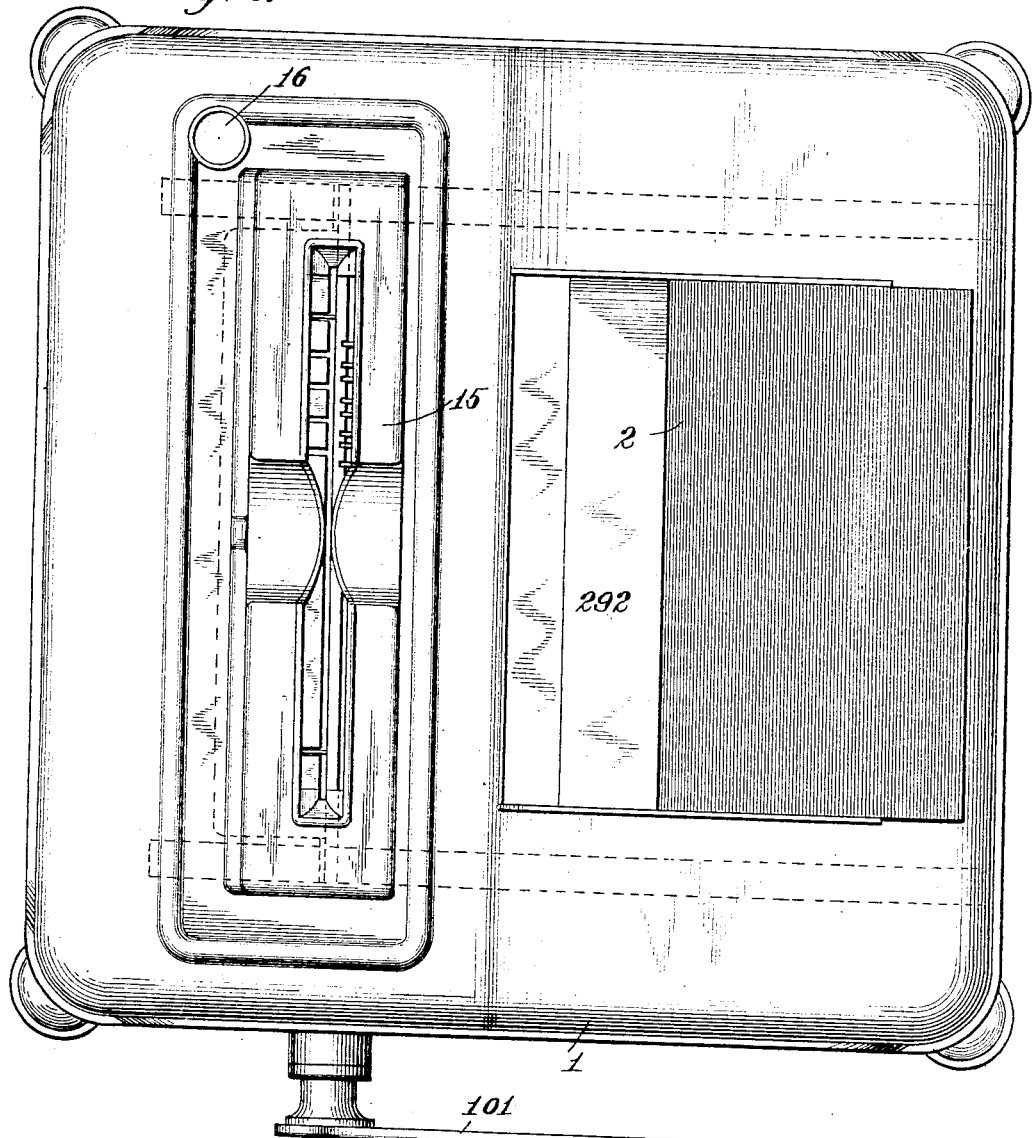
Fig. 2, is a plan view.

Before describing the details of the machine shown in the drawings, and in order that such description may be more easily understood, I will first briefly, and in a general way, describe the objects sought to be accomplished by the machine, what the operator does in working the machine and what results from its operation.

Figure 37:
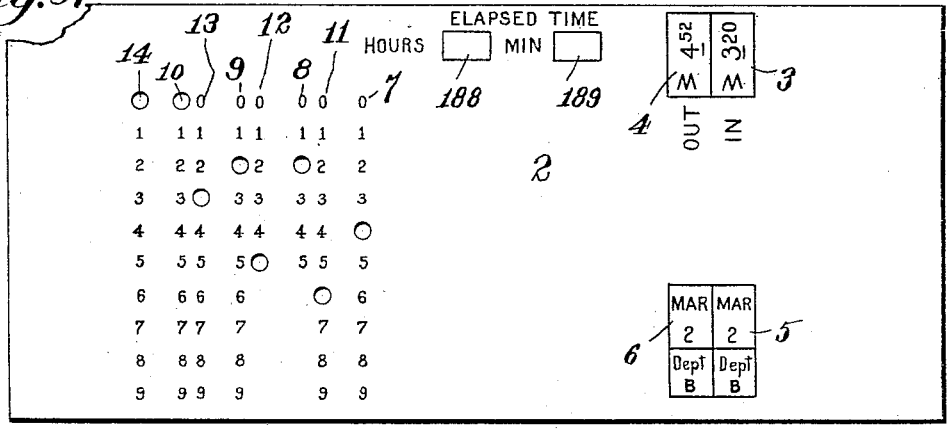
Fig. 37, is a face view of a record card as it appears before it is placed in the machine.

The machine, shown contained in the casing, 1, is adapted to operate on cards which have records of "in" and "out" operations printed thereon and perforations representing the time of such "in" and "out" operations. Such a card is shown at 2 (Fig. 37). The card shown is provided with a space 3 in which is printed the time of the first or "in" operation, and a space 4 in which is printed the time of the second or "out" operation.

Card 2 is also provided with spaces 5 and 6 having printing showing the date of the "in" and "out" operations, respectively, and the department name or number or letter.

The card 2 has two sets of perforations representing the "in" time and the "out" time of recording carried out in a mechanism such as is shown in my application, Serial Number 43,023 made on July 31st, 1915.

These perforations are one in each row representing the "in" operation, and are rows 7, 8, 9 and 10. (See Fig. 37). The "out" perforations are one each in rows 11, 12, 13 and 14.

Reference to Fig. 37 will show that the perforations in rows 7, 8, 9 and 10 represent the number 02.24 or two hours and twenty-four minutes. This is not two twenty-four o'clock, but two hours and twenty-four minutes after a zero start.

The "out" perforations in rows 11, 12, 13 and 14 represent the number 0356, or three hours and fifty-six minutes after a zero start.

Figure 38:
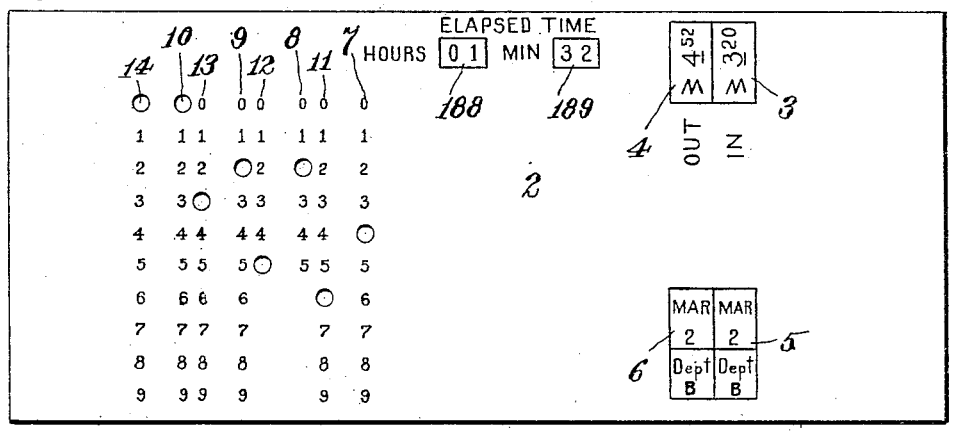
Fig. 38, is a face view of the card shown in Fig. 37, after it has been recorded upon.
Figure 39:
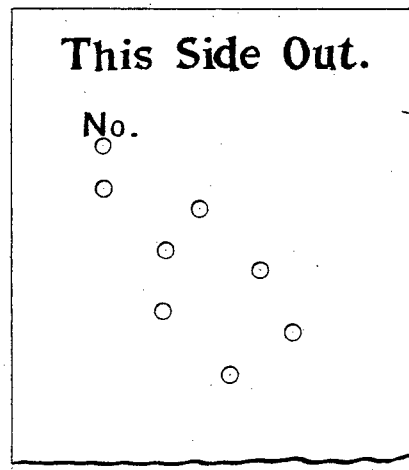
Fig. 39, is a rear view of the card shown in Figs. 37, 38.

At each operation of the machine shown in the drawings the difference between the "in" holes and the "out" holes is calculated by the mechanism and the elapsed time between these two records is printed upon the record card in the spaces 188 and 189, see Fig. 38; in the example shown, this is 01 hour and 32 minutes.

To perform this calculation, the operator takes the card 2 in Fig. 37 and inserts it in the throat 15 of the machine, pushes down button 16 with his left hand and then pulls the handle 17 with his right hand. When the button 16 is pushed down, the card is moved down into the machine and accurately alined with the mechanism and the type wheels 18, 19, 20 and 21. When the handle 17 is pulled the printing hammer causes the then condition of the type wheels to be imprinted on the record card. This condition of the type wheels is the difference in time between the "in" record punched in the card and the "out" record punched in the card. The mechanism that accomplishes this result will be presently described. The record cards 2 are stacked in a tray 292 located on top of the machine.

*Card receiver carriage and card justifying means.*

This is specially illustrated in Figs. 3, 4, 5, 6, 7, 8, 9, 10, 28, 29, 30, 31 and 32. For convenience, the throat plate 15, which is situated in the upper part of casing 1, is cut away on both sides to enable the operator to insert and withdraw the card for printing.

The carriage for moving the card (see Figs. 3, 4, 7 and 10) consists of side plates 23, 24 held together by rods 25, 26 and 27. The carriage has outwardly extending ears 28, 29 at the top and 28, 29 at the bottom embracing the fixed guide rods 30, 31. Gears 32, 33 on shaft 34, mounted loosely in bearings in the side frames 39, 40 and free to turn, engage with racks 35, 35 cut in the back edge of side plates 23, 24. The gears and racks serve the purpose of alining the two sides of the carriage, as pressure is applied at one side only to move the carriage. A coil spring 36 with one end fastened to the side frame 40 at 38 and with its other end attached to collar 37 fast on shaft 34 serves to keep the carriage in its normal position, and to return it to such position after it has been depressed.

Mounted on rods 25, 26, are card abutment plates 42, 43, which extend rearwardly and have abutment ledges 44, 44. In juxtaposition to the card abutment plates 42, 43 are the upwardly extending fingers 45, 46. (See Fig. 10). The carriage is moved downward and the fingers 45, 46 thrown across the card slot by the depression of the button 16. The means shown for this purpose are illustrated in Figs. 3, 4, 7 and 10.

Depression button 16 is mounted on push rod 41 which is supported by bracket 47 secured to side frame 39. (See Fig. 7). The lower end of rod 41 is telescoped into tube 48 which tube is supported by bracket 49 secured to side frame 39.

Rod 41 has a pin 50, projecting from a collar mounted thereon, which engages on the downward movement of the parts with a hook-lever 51 loosely pivoted at 52 to side plate 23 of the card receiver carriage.

Pin 50 first swings hook lever 51 on pivot 52 causing the upper surface 53 of the hook-lever 51 to engage the lower surface 54 of piece 55, which is secured to rock shaft 56 journaled in side plates 23 and 24. Mounted on rock shaft 56 are arms 57 and 58 whose rounded ends coact with bifurcated extensions 59, 60 forming parts of the two fingers 45 and 46 respectively. As the hook lever 51 rocks 55 on shaft 56 the arms 57 and 58 are raised, rocking fingers 45 and 46 and throwing them across the card slot over the card which has been inserted therein.

Mounted on side plate 23 is a locking pawl 61 pivoted at 62 and having a locking tooth which coacts with hook lever 51. The locking pawl 61 has an extending arm 63 which rests against a fixed portion of the machine, and is held normally in an upward position by spring 64.

As pin 50 engages and moves hook lever 51 and starts to move down the carriage the pawl 61 is moved so that arm 63 is allowed to rise and the notch in 61 locks against the edge of surface 53 of hook lever 51 and holds it in its moved position until the carriage returns to its normal upward position and the end of extension 63 comes in contact with a fixed portion of the machine and releases it.

The main handle 17 is secured to the main actuating shaft 65 which is journaled in the side frames 39, 40. Adjacent to the side frame 39, and mounted on main shaft 65 are cam 66 and locking plate 67. (See Fig. 11). These cams coact with devices for justifying the card receiver with respect to the printing line and for unlocking the main shaft 65 when button 16 is depressed. Referring particularly to Figs. 28, 29, 30, 31 and 32.

Fig. 28 represents these parts in their normal position. Mounted on the side plate 23 is a hook piece 68 which with the under side of extension 28 coacts with a roller 69. Roller 69 is mounted on arm 70 pivoted to the side frame 39 at 71. Pivotally mounted on the side frame 39 at 72 is a lever 73, its rear end 74 forming a tooth which locks in a notch 75 found in locking plate 67. A link 76 is pivoted at its lower end to arm 70 and at its upper end, has a slot 77 in which is mounted a pin 78 fastened to the forward end of arm 73.

On the same stud 72 which supports arm 73 is a rock lever 79 having at its rearward end a cam roller 80 which coacts with the cam 66. The forward end of rock lever 79 has mounted thereon a square pin 81 which at a point in the operation engages with the notch 82 of arm 83. Arm 83 is pivotally mounted on 70 at the same point as link 76. It has an extension 84 forming a stop and is held in normal position by spring 85.

In the normal position of the parts, as shown in Fig. 28, the tooth 74 in notch 75 keeps the main shaft locked against rotation. When a card is inserted in the throat of the machine and the button 16 is depressed the fingers 45, 46 are thrown across the top of the card, and the card pushed down into the machine. The ends of the card are guided by the card slots situated at either side of the machine. The card slots consist of the throat guide pieces 86, 87 mounted on the upper front part of side frames 39 and 40. Fastened to the side frames 39, 40 and immediately below the guides 86, 87, is the stripper plate 88. (See Fig. 11).

Mounted on the stripper plate 88 are the intermediate end guides 89, 90 and outside of these the outer guide plates 91, 92. (See Fig. 9).

The recesses 97, 98 formed by 89 and 91, and 90 and 92 give proper end guidance to the card as it is forced down into the machine. Intermediate pieces 89, 90 and outer guides 91, 92 form at the bottom two stop ledges, 93, 94 against which the card rests in its lowermost position. Slots 95 and 96 are provided in the stripper plate 88 so that abutment ledges 44 may project entirely across the card slot.

The operation of these parts is as follows:

The operator inserts a card 2 in the throat plate 15, and it rests against the abutments 44, 44 and its ends are in the guide slots 86, 87 just below the opening in throat plate 15. The upper edge of the card in this position is represented by the dot and dash line 97$^a$ (see Fig. 10) and its lower edge by line 98$^a$.

Now the operator pushes button 16 and pin 50 on push rod 41 engages hook lever 51 and rotates it slightly on its center 52. The upper surface 53 of hook lever 51 coacts with piece 55 and rock shaft 56 slightly which causes the arm 57 to move upward which throws the hooks, 45, 46 over the top of the card, leaving a space of about one-quarter of an inch between the top of the card and the under surface of the hooks. The pawl 63 is freed and the tooth on extension 61 locks the hooks in position.

The card receiver is now pulled down by pin 50 against the tension of spring 36 on shaft 34, the gears 32, 33 on shaft 34 serving as a connection to keep the side plates 23, 24 in alinement. As the card receiver descends, the extension ear 28 and hook 68 pick up roller 69 and rotate arm 70 on its center 71, taking up the lost motion of slot 77. Link 76 then pulls on pin 78 rocking lever 73 on its stud, and moving tooth 74 out of notch 75 freeing locking plate 67 so that main shaft 65 is unlocked and is now free to rotate. The parts are now in the position shown in Fig. 30. The tooth 82 on the end of arm 83 is now in engagement with square pin 81 and the card is resting approximately on the stop ledges 93, 94. As the card in the card slots or recesses 97, 98 is quite loose and may be slightly out of position, when the handle 17 is pulled, it is justified to bring it accurately to position as regards the printing line.

This is accomplished in the following manner: When the handle 17 is pulled by the operator, the cam 66 on main shaft 65 acts on roller 80 of rock lever 79 and the roller moves up on to the higher part of cam 66. This causes square pin 81, on the other end of rock lever 79 to push down on tooth 82 of arm 83 which is pivoted to piece 70 which carries roller 69 which is in engagement with extension ear 28 and hook 68. This causes the roller 69 to move to the position shown in Fig. 31. In moving down it pulls down the hooks 45, 46 a slightly farther distance. As the card is resting on the stop ledges 93, 94 it does not move and the abutment ledges 44 move down away from the record card 2. The hooks 45, 46, pick up the top of the card and finish their downward motion at such a point that there is just room for the accurately cut card to stand between the stop ledges 93, 94 and hooks 45, 46. This alines the card accurately with regard to the calculating mechanism and the printing line. At the same time as the main shaft 65 is being reciprocated the tooth 74 is riding on the top of locking plate 67 and the main handle is free to move until it returns to its normal position when tooth 74 drops into notch 75 and relocks it.

*Impulse mechanism.*

This is specially illustrated in Figs. 3, 9, 10, 11, 12 and 13.

Any suitable impulse mechanism may be employed. I will now proceed to describe that shown in the drawings. This impulse mechanism is actuated by means of the reciprocation of handle 17. It rocks main shaft 65 which in turn, through mechanism about to be described, reciprocates the main operating shaft 99. It is arranged so that in the earlier part of the operation, motion will be transmitted from handle 17 to the main operating shaft 99 in a yielding or flexible manner in order to perform the lighter and more delicate operations such as moving the elapsed time type wheels to their positions to correspond to the difference between the "in" and "out" punched records on the card; and in the latter part of the operation to transmit such motion in a rigid manner to perform the heavier or less delicate operation of printing the elapsed time.

In the earlier part motion is transmitted through springs 99ª, 99ª on the outside of side frame 40. (See Fig. 12).

Handle 17 is mounted on arm 101 which is rigidly secured to main shaft 65, which is journaled in side frames 39, 40.

Adjacent to the side frame 40 is an arm 102 secured to main shaft 65. (See Fig. 3). Near the rear of the machine is a rock shaft 103 journaled in the side frames 39, 40, and having mounted upon it an arm 104 corresponding to arm 102 on shaft 65. Arm 102 carries pin 105 on which are anchored springs 99ª, 99ª which have their rear ends anchored to pin 106 in arm 104.

Arm 104 and arm 102 are connected by link 107 having a slot 108 at its forward end and which embraces pin 109 on the upper end of arm 102. Arm 102 is held in a rearward position by means of springs 100, 100 located between side frames 39, 40. (See Fig. 12).

Main shaft 65 has mounted upon it arm 110 which carries pin 111. The forward end of springs 100, 100 are anchored to pin 111 and have their rear ends anchored to a fixed cross bar 112 which is supported by the side frames. These springs hold arm 102 in a rearward position, and as pin 109 presses against the rear end of slot 108 of link 107 which is pivoted to arm 104 at 113 arm 104 is held in a rearward position against stop 114 which is mounted in side frame 40. Mounted on rock shaft 103, and adjacent to the inside of side frame 40, is a gear sector 115 which meshes with gear sector 116 secured to main operating shaft 99. These gear sectors, 115, 116 serve to transmit motion from rock shaft 103 to main operating shaft 99 when handle 17 is operated. (See Fig. 36).

The connecting link 107 with slot 108 is slidably mounted on stud 109. Mounted on stud 109, behind link 107 is a block 117, having a short slot 125 where it embraces stud 109. Block 117 has a sloped portion 118 at its rear end which normally rests on pin 119 which is supported by plate 120 fast on side frame 40. Pin 119 normally holds lock block 117 in a slightly raised position when the parts are in the position shown in Fig. 3 or in other words the machine is at rest. Lock block 117 has on its upper edge a notch 121 which under certain conditions coacts with a square pin 122 mounted in side frame 40. On the lower edge is a notch 123, which engages with hook 124, secured to the back of link 107, for producing a rigid connection during the latter part of the stroke. Lock block 117 has mounted upon it a roller 126 which has bearing upon the arm 127, pivotally mounted upon link 107 with stud 128 and having spring 129 pulling it downwardly against roller 126. Between pin 105 and stud 109, both of which are on arm 102 is a rock pin 130 having mounted on it the bifurcated piece 131 the arms of the bifurcated portion embracing the head of the stud 109. (See Fig. 3). On its other end, that is, on the back of arm 102, pin 130 has mounted upon it a pawl 132. The pawl 132 has a spring 133 tending to pull it upwardly. As long as stud 109 is at the rear of slot 108, the tip of pawl 132 is held downward by a pin 134 on link 107 pressing on one of the arms of bifurcated piece 131. Pawl 132 is in such a position on arm 102, that in the reciprocation of the arm when an improper card has been inserted in the machine, it coacts with a pawl 135 to prevent the machine printing any record of the elapsed time. The action of pawls 132 and 135 will be hereinafter described.

In an impulse of the character described I preferably provide retarding means to prevent a too sudden operation of the parts. For this purpose, main operating shaft 99 has mounted upon it an arm 136 (see Fig. 36) which by a short link 137 is connected to an arm 138 pivoted to the side frame 40 at 139. The cylinder of an oil dash pot 140 is pivoted to arm 138 at 141. The piston rod 142 of the dash pot 140 is fastened to a rod 143 supported in the side frames 39, 40.

This dash pot may be of any well known construction, such as one having a piston provided with holes having valves which close on the forward stroke of the handle and open on the return stroke. The dash pot prevents excessive speed on either the forward or return stroke and thus avoids sudden shocks and jars and causes the mechanism to work more smoothly.

When handle 17 is operated motion is imparted to rock shaft 103 only through springs 99$^a$, 99$^a$, thus giving a yielding or flexible connection in the early part of the movement. The position of the arm 136 is such that the dash pot piston moves slowly at first, without much resistance. This allows the handle to start easily. The resistance increases rapidly and if the handle is pulled too fast the springs 99$^a$, 99$^a$, stretch. This stretching of these springs 99$^a$, 99$^a$ causes a certain action of lock block 117 which will now be described. If the handle 17 is moved at a comparatively low speed, that is at a speed at which the calculating mechanism of the machine will act properly, the pin 109 remains at the rear of slot 108, and springs 99$^a$, 99$^a$, do not stretch. Arms 102 and 104 move in unison through the same angle.

Figure 3:
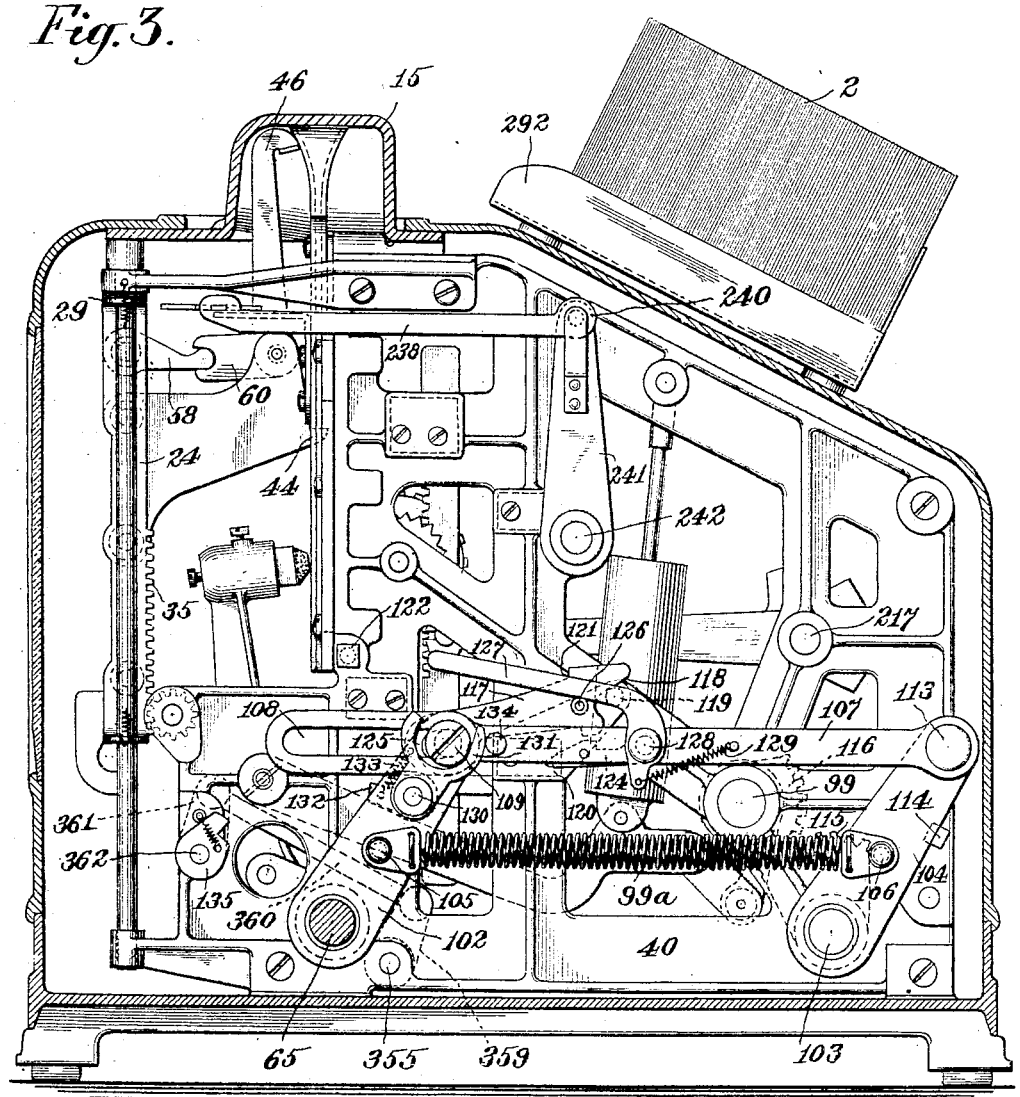
Fig. 3, is a side elevation of the mechanism, the casing being in section and looking in the direction of the arrows 3—3 of Fig. 9.
Figure 13:
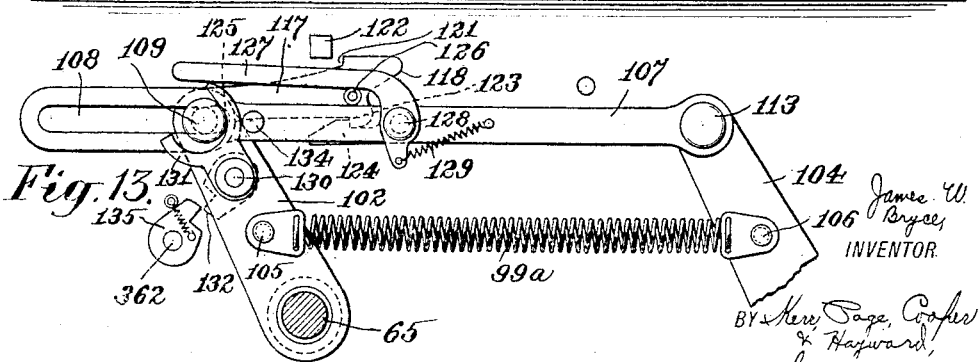
Fig. 13, is a detail view showing a portion of the impulse mechanism.

As the arm 102 starts to move from the position shown in Fig. 3, the lock block 117 lags behind until the lost motion of slot 125 is taken up when notch 123 is locked into hook 124 which makes a rigid connection between arm 102 and arm 104, lock block 117 being forced down into locked position by spring pressed arm 127. In this position the upper part of 117 will just miss pin 122 (see Fig. 13) and the parts would go the rest of the stroke in this condition.

If, however, the handle is pulled so fast that the springs 99$^a$, 99$^a$ are stretched the lock block 117 is so far forward that it cannot lock up with hook 124. The pin 134 is back in such a position that the bifurcated arm 131 is moved and spring 133 pulls up pawl 132 so it will interfere with the tip of pawl 135 and stop the handle until the link 107 and arm 104 catches up with arm 102 when pawl 132 will be released by pin 134 striking the arm of 131. Just after this notch 123 is locked into 124, providing it has not already occurred. Pin 122 acts as a cam on notch 121 to force lock block 117 downward into locked position. By this means the mechanism of the machine always runs at a speed allowed by the dash pot or at a less speed. If a wrongly punched card is put into the machine, mechanism which will be described later, causes pawl 135 to move so as to interfere with pawl 132 and stop the handle before the printing action takes place.

*Elapsed time type wheels.*

This is specially illustrated in Figs. 4, 8, 9, 12, and 14.

The type wheels 18, 19, 20 and 21 are mounted on rod 175 supported by side frame 40 and sub-frame 176. These type wheels are placed so that type wheels 20 and 21, will print in space 188 and type wheel 18 and 19 in space 189.

Type wheel 18 is the minute, 19 the tens of minutes, 20 the hour and 21 the ten of hours type wheel. These type wheels are controlled in moving to their elapsed time indicating position by levers which are actuated by the "in" and "out" indicating racks as will be hereinafter described.

Type wheel 18 has mounted integrally with it a pinion 177 and finder wheel 178. The type wheel 18 has twenty characters upon it and the gear 177 ten teeth while the finder wheel has twenty teeth. The type wheels 19, 20 and 21 have corresponding gears and finder wheels mounted with them.

Type wheel 19 has gear 186 and finder wheel 187. Type wheel 20 has gear 188ª and finder wheel 189ª, and type wheel 21 has gear 190 and finder wheel 191. These wheels with their gears and finder wheels are free to rotate and are controlled in their rotation to their elapsed time position by the racks 192, 193, 194 and 195. (See Fig. 9).

Rack 192 meshes with gear 177, 193 with gear 186, 194 with gear 188ª and rack 195 with gear 190.

These racks are guided in slots in cross bar 195ª and slots in plate 196 secured to cross bar 197. These slots give side guidance so that racks are free to move but stay accurately in mesh with their gears.

Mounted on main actuating shaft 99 is a lever 198 which has pivotally mounted to its outer end a connecting link 199 having a slot 200 near its upper end. A pin 201 in this slot connects the link 199 to an arm 202 of the finder mechanism. A spring 203 connects arm 202 with an upwardly extending portion of link 199.

Secured to rod 175 is a side plate 203ª. (See Fig. 14). Journaled in this side plate 203ª, and subframe 176 is a rock shaft 204. Mounted on rock shaft 204 are four finders 205, 206, 207, 208 coacting with the finder wheels 178, 187, 189 and 191. Each finder terminates in a tooth 209 (see Fig. 4) which at the moment of printing fits into the tooth of the finder wheel which is under it and securely locks it and lines it up so that proper alinement of printing is secured.

Each finder has a rearwardly extending arm 210 which terminates in a stop resting on cross bar 211. Arm 202 has an extension which embraces rock shaft 204 and is fastened to finders 205, 206, 207 and 208 by means of pin 212. In the normal position of these parts the finders are held out of engagement with the finder wheels. When the machine is operated the finders are freed by the arm 198 moving upwardly and are finally pressed into position to lock the type wheels in alined position.

Racks 192, 193, 194, 195 are moved by arms 213, 214, 215 and 216 which are mounted upon rod 217. (See Fig. 9.) Each of these arms has a bifurcated end embracing a pin 218 secured to each of the racks 192, 193, 194 and 195.

The movement of these arms, 213, 214, 215 and 216 serve to position the corresponding rack, gear, finder wheel, and type wheel and at the printing time the finders 205, 206, 207 and 208, and lock them in their then position.

*Identifying pins and their connections.*

These are specially illustrated in Figs. 5, 6, 8, 10, 11, 17, 20, 25 and 26. The elapsed time type-wheels are controlled in their movement by means of records of previous "ins" and "out" operations of a time recorder adapted to make such records, these records being in the form of time identification holes, as previously described. This control in the machine shown is affected through pin boxes, each row of pins representing different units; which boxes are mounted so as to be moved toward and away from the card, so that any pin corresponding or registering with a hole in the card will project through it into the path of the "in" and "out" racks and thereby influence the extent of movement of the corresponding rack.

Referring now to the specific mechanism shown, 213ª, 214ª, 215ª and 216ª represent the "in" rows of pins, each row of pins being 10 in number with the 0 pin at the bottom, and the 9 pin at the top.

Pins 213ª, 213ª represent the minute, 214ª, 214ª, tens of minutes, 215ª, 215ª hours and 216ª, 216ª tens of hours. If the previous "in" and "out" records are made in hours and minutes, as there are sixty minutes in an hour, only six of the pins 214ª will be used. If, however, the previous records are in hours and hundredths of an hour all ten of pins 214ª will be used.

217, 218, 219 and 220 represent the "out" rows of pins, each row being 10 in number with the 0 pin at the bottom. Pins 217, 217 represent the minute, 218, 218 represent the tens of minutes and may be six or ten in number, 219, 219 the hours and 220, 220 the tens of hours. (See Fig. 17.) One of these pin boxes is shown in Fig. 26.

The "in" pins 213ª are mounted in pin boxes 221 loosely mounted on main shaft 65. Pin box 222 carries "out" pins 217 and "in" pins 214ª; pin box 223 carries "out" pins 218 and "in" pins 215ª. Pin box 224 carries "out" pins 219 and "in" pins 216ª. Pin box 225 carries a single row of "out" pins 220.

These pin boxes are substantially of the same construction and a description of the minute pin box shown in Fig. 26 will suffice for them all.

The pins 213ª are mounted at the top of a lever 221 loosely mounted on main shaft 65. The lever 221 has the edges of the upper portion turned into two flanges 226, 227 which support the pins. Each pin is provided with a collar 228 and a compression spring 229. Each pin box has an upwardly extending lug 230 which fits in a slot 231 formed in a plate 232 supported by the side frames 39, 40. (See Fig. 11.) The stripper plate 88 has a series of holes corresponding to the pins to allow the pins which register with the punched holes in the card to pass through such holes and through the corresponding holes in stripper plate 88 and to project beyond the latter as shown in Fig. 26. In this position they will be in the path of a shoulder of the corresponding rack which is guided in a groove in the back of plate 88.

These pin boxes are adapted to be moved toward and away from the card which is supported in the slots 97, 98.

The pin boxes 221, 222, 223, 224, 225 are moved toward the card by means of a slide plate 233 which is slidably mounted on plate 232. Slide plate 233 is secured to plate 232 by means of screws 234, 234. Slide plate 233 extends across the machine and at either end has an extension 236, 237 which are riveted to two links 238, 239. (See Fig. 8.)

Link 238 has its rear end pivotally connected at 240 to a lever 241 secured to rock shaft 242. (See Fig. 3). Rock shaft 242 is journaled in side frames 39, 40 and extends clear across the machine.

On the end opposite to lever 241 is a lever 243 which is pivotally connected to link 239 at 244. (See Fig. 7). Lever 243 has a downwardly extending arm 245 having at its lower end a pin 246 which secures to it the slotted link 247. Link 247 with slot 248 is pivotally connected to a lever 249 which is mounted on main actuating shaft 99. Pivotally secured to stud 246 is a hook 250 which is adapted to coact with a pin 251 secured in side frame 39. Hook 250 has an extension 252 one portion of which 253 forms a stop and to the other portion is anchored a spring 254 having its other end attached to extension 245 of lever 243.

Figure 18:
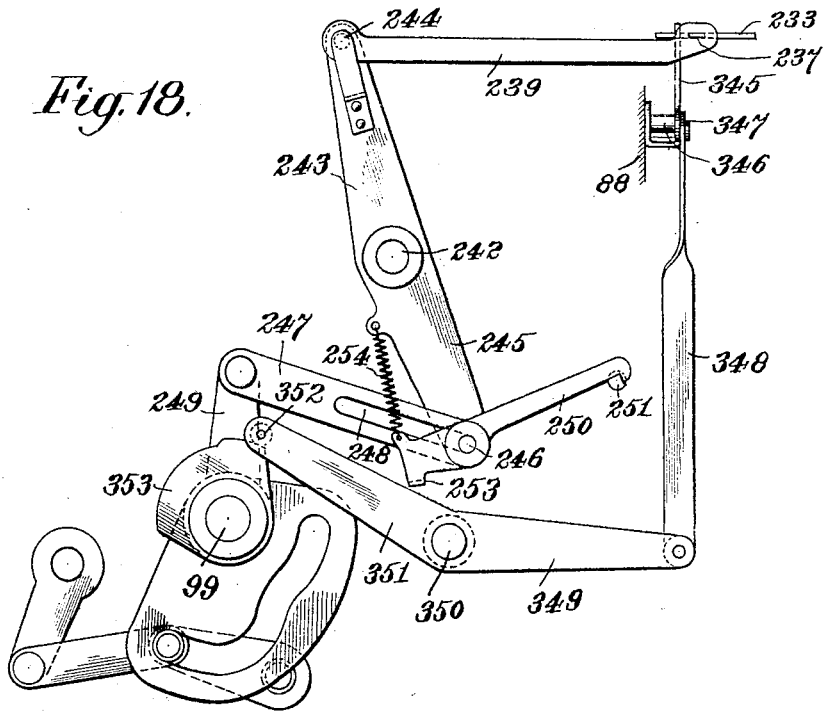
Fig. 18, is a detail showing the mechanism of Fig. 7 in another position.
Figure 19:
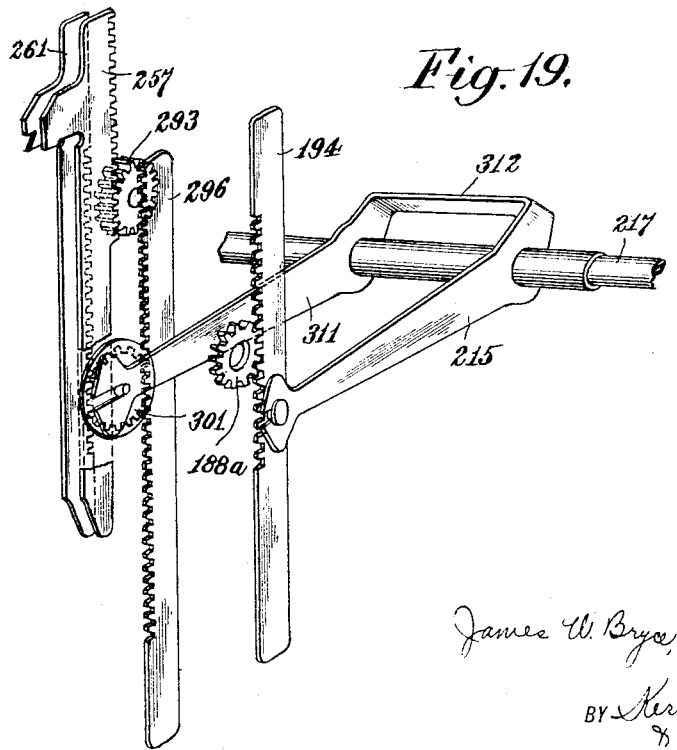
Fig. 19, is a perspective view of the parts used in the calculation of one elapsed time digit.

When the handle 17 is pulled and main actuating shaft 99 is rocked arm 249 moves upwardly to the position shown in Fig. 18. Stud 246 stands in an intermediate portion of slot 248 when the parts are in normal position. (See Fig. 7). As arm 249 begins to rise it pushes up link 247 until the lower end of the slot 248 picks up stud 246. It then rocks shaft 242 which causes levers 243, and 241 on shaft 242 to move rearwardly, carrying with them links 239 and 238 to which plate 233 is riveted. Plate 233 has mounted upon it borrowing slide 337. As plate 233 and slide 337 move they press upon the extensions 230 of pin boxes 221, 222, 223, 224 and 225 and so pull the pin boxes up against the card.

As the shaft 242 was rocked the hook 250 was rocked on its center by the spring 254 keeping stop 253 against link 247.

As the link between 247 and lever 249 overthrow, the hook 250 locks up with pin 251 in the position shown in Fig. 18.

Lever 249 continues to move and the slot 248 allows this to take place leaving the hook 250 and the levers 243, 241 in their rear position and the slide 233 forced rearwardly holding the pin boxes 221, 222, 223, 224 and 225 up against the record card in the position shown in Fig. 17.

Figure 7:
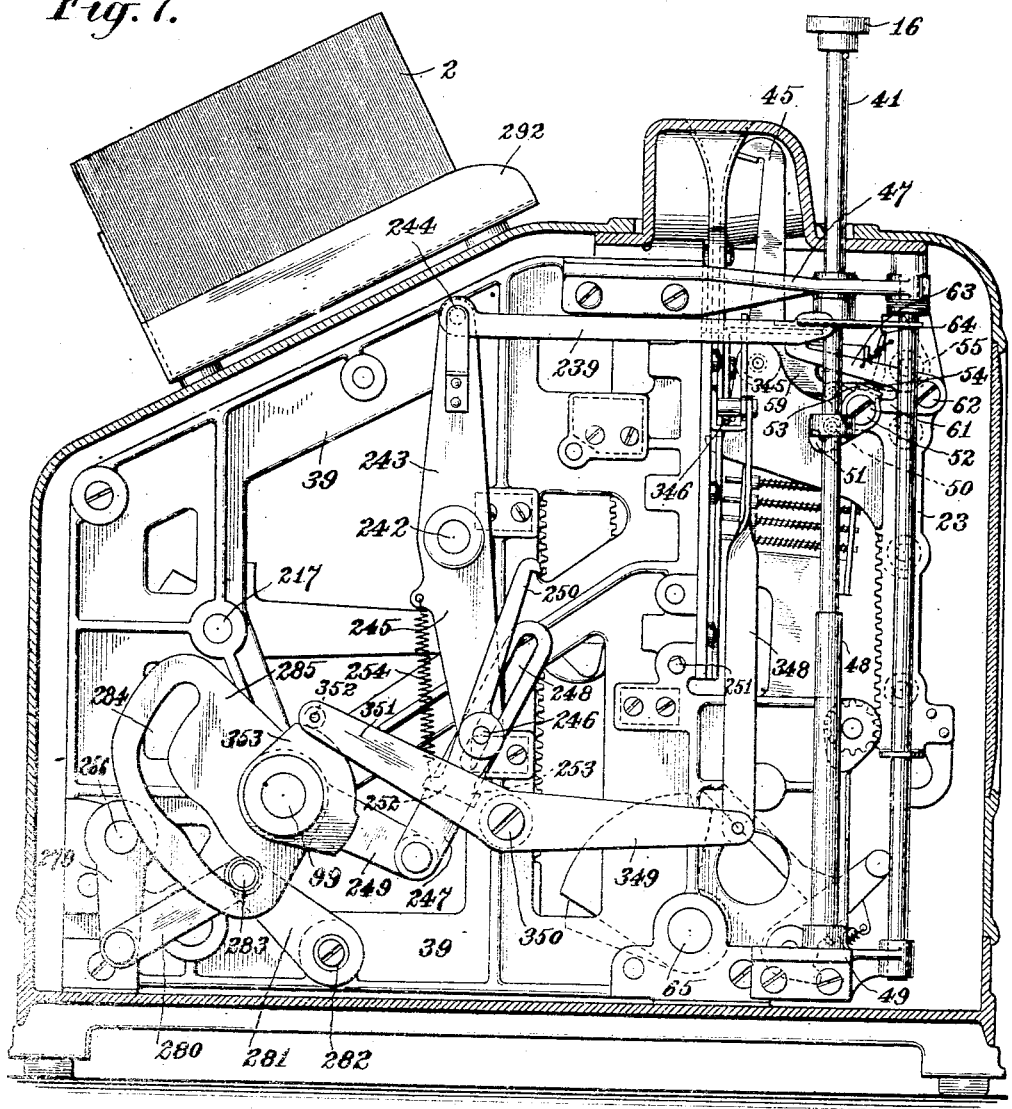
Fig. 7, is an elevation of the mechanism, the casing being in section and looking in the direction of the arrows 7—7 of Fig. 9.

The pin boxes stay pulled up, the parts being in the position of Fig. 18, until lever 249 returns and the link 247 picks up stop 253 and releases hook 250 from pin 251 and the parts return to the position shown in Fig. 7.

*In and out racks and their accompanying mechanism.*

Each row of "in" pins is provided with an identifying rack to determine which pin has passed through the hole in the card and so control certain parts in their operation. Minute pins 213ª have rack 255, tens of minutes pins 214ª have rack 256, hour pins 215ª have rack 257 and the tens of hours pins 216ª have rack 258. (See Fig. 8). Correspondingly each row of "out" pins are provided with identifying racks.

Minute pins 217 have rack 259, tens of minutes pins 218 have rack 260, hour pins 219 have rack 261 and tens of hour pins 220 have rack 262. (See Fig. 8).

These racks are all mounted in slots cut in the front side of cross bar 195ª and in the rear side of cross bar 158 and are free to slide therein. "In" rack 255 (see Fig. 26) has a projecting portion 263 which engages with a groove in the back of stripper plate 88 and which serves to guide the projecting portion 263 into proper coaction with the pins.

Each of the four "in" racks 255, 256, 257 and 258 has secured to their lower ends shouldered pins 264, 264. The pin 264 of "in" rack 255 is embraced by the bifurcated end of lever 265 which is loosely mounted on rock shaft 266 extending across the machine and journaled in the side frames. Lever 265 has an upwardly extending portion 266ª to which is attached a spring 267. Spring 267 has its lower end attached to an L shaped piece 268 which is riveted between two side plates 269, 270 which are secured to the rock shaft 266. (See Figs. 5 and 9). A flat portion 271 of lever 265 rests against one of the flat surfaces of the L shaped piece 268. Each of the three other "in" racks 256, 257 and 258 have similar levers 272, 273, 274 (see Fig. 9) similarly mounted on rock shaft 266.

Each of the four "out" racks 259, 260, 261, 262 are each provided with levers loosely mounted on rock shaft 266 and having bifurcated ends and having a portion similar to 271 of lever 265 resting against the L shaped piece 268.

These levers are 275 for rack 259, 276 for rack 260, 277 for rack 261, and 278 for rack 262. (See Fig. 9).

These levers all have extensions similar to 266 and springs similar to 267. Rock shaft 266 has on its outer end adjacent to side frame 39 (see Fig. 7) a lever 279. At its end lever 279 has pivoted to it a link 280 which forms one member of a toggle, the other member being arm 281 pivoted to side frame 39 at 282. The pivot joint between 280 and 281 carries a cam roller 283 which coacts with cam groove 284 formed in cam 285, which is secured to main actuating shaft 99. When these parts are in normal position the L shaped pieces 268 hold up the four "in" levers 265, 272, 273, 274 and the four "out" levers 275, 276, 277, 278, and so hold up the four "in" racks 255, 256, 257, 258 and the four "out" racks 259, 260, 261, 262, slightly above the first pin position. (See Figs. 5 and 6). When main actuating shaft 99 is rotated cam groove 284 acts to depress roller 283 moving lever 279 and rocking shaft 266. This lowers L shaped piece 268 and the "in" and "out" levers are allowed to drop. This allows the "in" and "out" racks to drop until the extension or tooth 263 of each rack comes in contact with an identifying pin which has passed through the hole in the card. L shaped piece 268 moves down a sufficient distance to allow a rack to drop slightly below the lowest pin. If the racks move sluggishly the springs 267 pull down the levers to position. When the cam 284 returns to normal the L shaped piece 268 is raised and gathers up the "in" and "out" levers from their pin stopped position and raises them to normal and restoring the "in" and "out" racks to the position shown in Figs. 5 and 6.

*The elapsed time differentials, their connections with the elapsed time type wheels and the borrowing mechanism.*

The "in" rack 255 has cut on its back edge teeth 286 which mesh with the teeth of a transfer pinion 287, free to rotate on rod 288. Rod 288 is supported by sub frame 176 and side frame 39. (See Fig. 8). The transfer pinion 287 meshes with teeth 289 cut in the front edge of transfer rack 290. Transfer rack 290 is slidably mounted in slots in cross bars 197 and 211. Each of the other "in" racks have corresponding transfer pinions and transfer racks mounted in slots in cross bars 197 and 211. "In" rack 256 has transfer pinion 291 and transfer rack 295. "In" rack 257 has transfer pinion 293 and transfer rack 296. "In" rack 258 has transfer pinion 294 and transfer rack 297. (See Fig. 8). The transfer pinions, 287, 291, 293 and 294 merely reverse the motion so that when any "in" rack drops a certain distance the corresponding transfer rack will rise the same distance.

Figure 8:
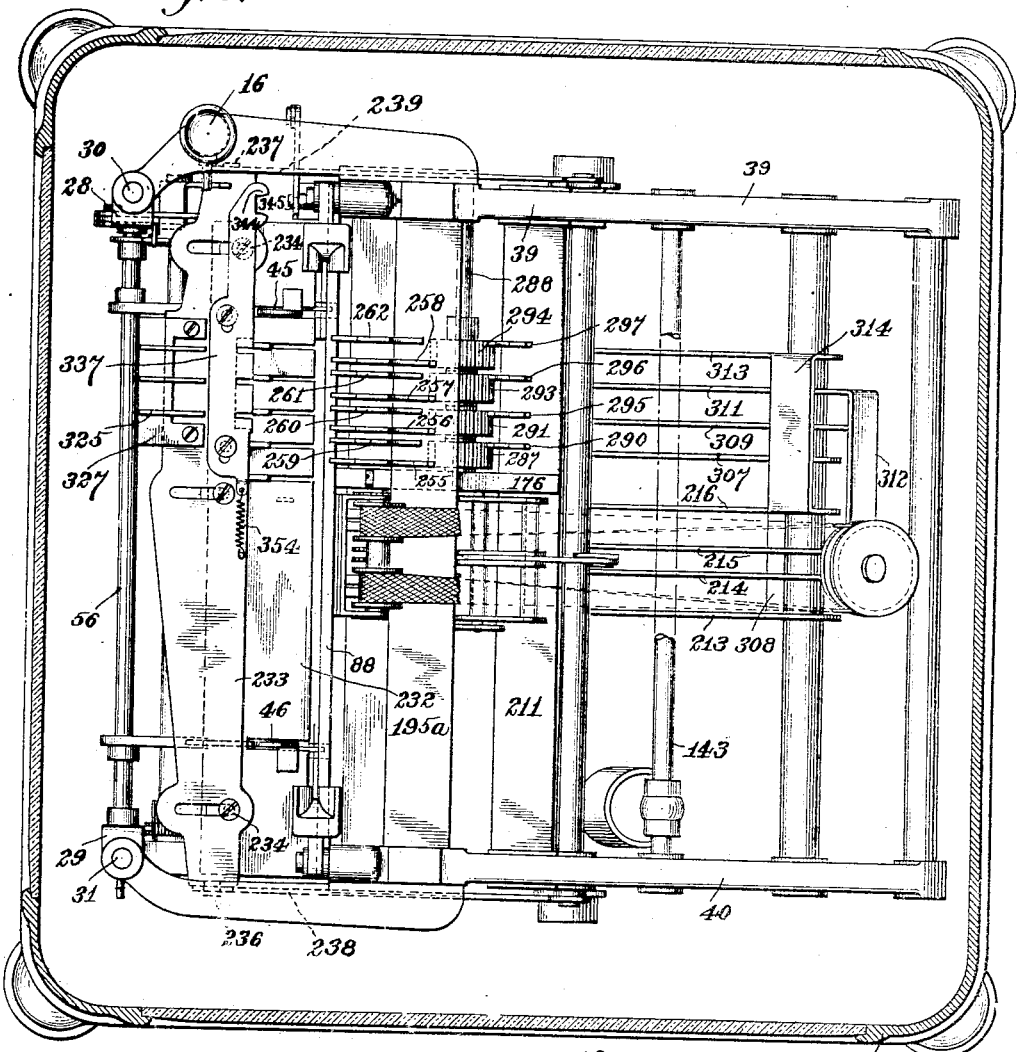
Fig. 8, is a top view of the mechanism.

The "out" rack 259 has teeth 298 cut in its rear edge. Referring to Fig. 8 it will be noted that "in" rack 255 and transfer rack 290 are offset the width of the transfer pinions 287. This brings the teeth 289 on the front edge of transfer rack 290 exactly in line with the teeth 298 on the rear edge of "out" rack 259. Differential gear 299 meshes with both the teeth on "out" rack 259 and the teeth on transfer rack 290. Each "out" rack and each transfer rack have corresponding differential gears. "Out" rack 260 and transfer rack 295 have differential gear 300. "Out" rack 261 and transfer rack 296 have differential gear 301, and "out" rack 262 and transfer rack 297 have differential gear 302 meshing with the teeth cut in the racks. (See Fig. 9). Differential gear 299 has a stud 303 forming a pivot and on each side of the differential gear 299 and mounted on stud 303 are housings or shrouds 304, 304. The differential gear 299 which is free to rise or fall as the operation requires is supported by the bifurcated ends 305, 306, which embrace stud 303, of a lever 307 which is loosely mounted on rod 217.

Lever 307 is controlled in its movement by the "out" minute rack 259 and the "in" minute transfer rack 290, and is integrally fastened to the minute type wheel operating lever 213 by cross over extension 308. (See Fig. 8).

Lever 307, crossover 308 and lever 213 are formed of one piece of metal. The other "out" racks and "in" transfer racks have similar parts coacting with them and their differential gears, and the parts are similarly mounted. "Out" rack 260, differential gear 300 and "in" transfer rack 295 coact with lever 309, which lever by crossover 310 (see Fig. 9) is integrally formed with the tens of minutes type wheel operating lever 214.

"Out" rack 262, differential gear 301, and "in" transfer rack 296 coact with lever 311, which lever by crossover 312 is integrally formed with the hour type wheel operating lever 215, "out" rack 261, differential gear 302, and "in" transfer rack 297 coact with lever 313, which lever by cross over 314 is integrally formed with the tens of hours type wheel operating lever 216. The four differential levers 307, 309, 311, 313 each have a spring 363 having its upper end attached to a plate 364 and which tend to hold the levers in an up position.

From this it will be seen that as a differential gear rises or falls its corresponding type wheel will be rotated one way or the other.

As an "out" rack moves downward its corresponding differential gear will move downward and as an "in" rack moves downward its corresponding "in" transfer rack moves upward and the differential gear will move upward. The type on the type wheels are so arranged that as the differential gear rises it will tend to add on the wheel, that is to rotate it from zero upward. The type wheels stand normally at zero.

If the downward movement of the "out" racks and the upward movement of the corresponding "in" transfer rack is at the same rate, the corresponding differential will simply rotate without rising or falling until one or the other of the racks has stopped, whereupon the other rack in the rest of its movement will move the differential upward or downward, as the case may be, the resultant of the two movements being that which affects the movement of the differentials and so the movement of the type wheels.

It is immaterial in what order these upward and downward movements take place, whether simultaneously as shown, or at the same rate if simultaneously, or whether successively. The result will be the same whatever the condition as will presently appear.

In Fig. 26, I have illustrated the condition of the "in" and "out" racks of the minute columns. Referring to Fig. 37, it will be seen that the "in" time number punched in the record card 2 is 02.24 while the "out" time number is 03.56.

Referring to Fig. 26 the "in" rack 286 has stopped at pin 4 and has moved the transfer rack 290 up six units and so the differential has moved up six units. At the same time the "out" rack has stopped at pin 6 so the rack has moved down four units and has moved the differential down four units. As a result of these two movements the differential gear 299 has moved up one unit as the differential only moves vertically half as far as either of the racks.

This one unit movement upward of differential gear 299 acting through lever 307, cross over 308 and typewheel actuating lever 213. The pinion 177 on type wheel 18 is of such a size that this movement will move type wheel to the second character and it will print the character 2. In the same way with the tens of minutes "in" rack at 2 and the "out" rack at 5 the type wheel will stand at 3 and with the hour "in" rack at 2 and the hour "out" rack at 3 the type wheel will stand at 1. These operations occurring at the same time the finders will lock the type wheels at the position 0132 and these characters will be printed on the card. (See Fig. 38.)

This method of operation always occurs when the digit of the "out" time number is larger than the corresponding digit of the "in" time number and under this condition the differential gear always moves upward, turning the corresponding type wheel in an additive direction. If, however, the digit of the "out" time is of a less value than the corresponding digit of the "in" time it is necessary to borrow one from the next higher resultant digit.

For instance, if the "in" time number is 2.28 and the "out" time number is 3.44 the difference between 8 and 4 is that between 8 and 14 or 6 and it will be necessary to borrow one from the tens of minutes column.

In this case, the differential has moved downward and whenever this occurs and it goes below its normal or zero position, the corresponding type wheel is rotated back of its normal or zero position, one must be borrowed from the type wheel of the next higher order.

Any suitable borrowing device may be employed. I will now proceed to describe the device which I employ for this purpose:

In order to permit the borrowing operation to take place I preferably cause the pin boxes, after they have been moved forward against the card in the first part of the operation of the machine, and after the "in" and "out" racks have fallen and been caught by the projecting pins, to move backward slightly so as to remove the projecting pin from contact with a portion of the projection or shelf 263.

I provide each "in" rack of a higher than the lowest, that is the tens of minutes, hour and tens of hours, with a projection or notch or shelf 315, (see Fig. 5) one point higher than shelf 263. Accordingly, when the pin box is moved slightly backward, the projecting pin will clear shelf 263 permitting the rack to fall farther but it will still lie in the path of shelf 315 and permit the "in" rack to fall but one point farther. Accordingly, the "in" transfer rack moves upward one point additional and the differential gear moves upward one unit of movement more so rotating the type wheel one character more toward the zero and so borrowing one from such type wheel. This is accomplished by the following mechanism.

As before described, pin box 221 supports the minute "in" pins 213ᵃ and pin box 222, "out" pins 217 and "in" pins 214ᵃ. "In" pins 214ᵃ control "in" rack 256, transfer pinion 291 and "in" transfer rack 295. Transfer rack 295, differential gear 300 and "out" rack 260 coact together. Rack 260 is controlled in its falling by "out" pins 218 so that pin box 223 is the first one that needs to be dropped back in order to borrow.

The bifurcated end 305 of lever 309 Fig. 6 carries a pin 316 at its lower end. This pin 316 coacts with a cam lever 317 having a cam surface 318 which is adjacent to the pin 316 when the pin is in zero position. Cam lever 317 is loosely mounted on a rod 319 supported by side frame 39 and sub-frame 176. Cam lever 317 has an extending arm 320 and below the cam 318 is extended in a curved arm so proportioned that when the differential gear 300 moves downwardly pin 316 will rock cam lever 317 on rod 319 and then on further movement downward, pin 316 riding on curved arm 321 will hold cam lever 317 in rocked position and the arm 320 slightly upward. Arm 320 is pivotally connected to link 322 which has a slot 323 at its upper end. The slot 323 has in its stud 324 securing the link 322 to hook piece 325 which is pivoted to pin box 223 at 326.

Secured to slide plate 233 is a hook plate 327 (see Figs. 8, 20 and 23) and hook piece 325 extends up over this and terminates in a hook 328. Each of the other differential gears and pin boxes have similar mechanism.

Differential gear 301 has pin 329, cam lever 330 connecting link 331 and hook piece 332 pivoted on pin box 224. Differential gear 302 has pin 333, cam lever 334, connecting link 335 and hook piece 336 pivoted on pin box 225.

Mounted on slide piece 233 is the borrowing slide 337 (see Figs. 8 and 20). The borrowing slide 337 has slots 338, 338, in which are shouldered screws 339, 339. On its rear edge are slots 340, 341, 342 which coact with the extension 230 of pin boxes 223, 224, 225. Borrowing slide 337 has an extension 343 terminating in a bifurcation 344 which coacts with a bell crank lever 345 mounted on stripper plate 88. Referring to Figs. 7, 10, and 18, bell crank lever 345 is secured to stripper plate 88 by stud 346. The other arm 347 of bell crank lever 345 is pivoted to the arm 349 of a rock lever pivoted to side frame 39 at 350. The rearwardly extending arm 351 of the rock lever carries at its end a cam roller 352 which coacts with a cam 353 mounted on main actuating shaft 99. When, as before described, the links 238, 239 pull the slide 233 rearwardly so as to pull up the pin boxes, the movement of slide 233 and borrowing slide 337 mounted therein, bring the bifurcated end 344 into engagement with the end of the lever 345 as shown in Fig. 21. When the rise in the cam 353 reaches roller 352 it rocks the lever 351, 349 on stud 350 and pulls down on link 348. The downward motion of link 348 moves bell crank lever 345, 347 on its stud and the end 345 being in engagement with the bifurcation 344 moves borrowing slide 337 into the position shown in Fig. 22, against the action of spring 354. This causes the slots 231 in plate 232 to be coincident with the slots 340, 341, 342 in borrowing slide 337. The first two slots 231 guiding extension 230 of pin boxes 221 and 222 have no corresponding slots in borrowing slide 337. When the digit of the "out" time is smaller than the corresponding digit of the "in" time borrowing must take place on the next higher order. For instance, if the "in" time number is .0259 and the "out" time number is 03.36 the example to be solved is as follows:

$$03.36 - 0259 = 0047.$$

The "in" rack dropping to 9 and the "out" rack dropping to 6 the differential moves down three units carrying the type wheel backward from 0 to the third character which is 7.

When the differential moved down the first unit, pin 316 rocked cam lever 317 on rod 319 and link 322 moved up and raised hook 328 out of engagement with 327. In the further operation of the machine cam 353 coacts with rock lever 349 to move lever 345. As lever 345 is in engagement with the bifurcation (see Fig. 21), the borrowing plate 337 will be moved to the position shown in Fig. 22. At this time the slots 231 and 340 coincide and pin box 223 drops back against the back of slot 231. This allows the "in" rack 256 to drop one more point which raises the transfer rack 295 one point, so that the second digit or tens of minutes type wheel will stand at 4 instead of 5. It being understood that the tens of minutes type wheel is engraved from 0 to 6 instead of 0 to 9 as there are 60 minutes in the hour.

The tens of minutes wheel borrows from the higher column in the same way.

Cut out device.

This is specially illustrated in Figs. 3, 5, 6 and 15.

In order to prevent a card being printed which is incorrectly punched I have provided the following mechanism: Journaled in the side frames 39, 40 is a rock shaft 355, to which is secured the arms 356 and 357, supporting the universal bar 358. If a card is inserted in the machine which does not have a hole perforated in it, the rack drops slightly below the lowest pin of that column and its corresponding lever hits universal bar 358 and rocks shaft 355 slightly. On shaft 355 and adjacent to side frame 40 is mounted a lever arm 359. At its outer end lever arm 359 is pivotally connected to link 360 which is connected at its other end with lever 361. This lever is mounted on the stub shaft 362 which is journaled in side frame 40 and on its outer end has secured to it pawl 135 previously described. When one of the dropping levers hits universal bar 358 and shaft 355 is rocked the link 360 rocks the stub shaft 362 so that pawl 135 moves into the path of pawl 132 and stops the impulse at that point and so prevents any record being made on the card.

Ink ribbon mechanism.

Figure 16:
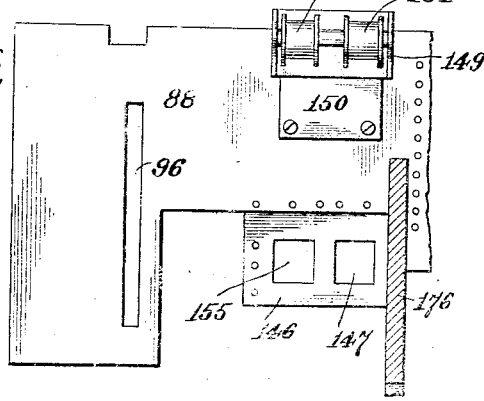
Fig. 16, is a detail showing a rear view of a portion of the rack guide plate.
Figure 12:
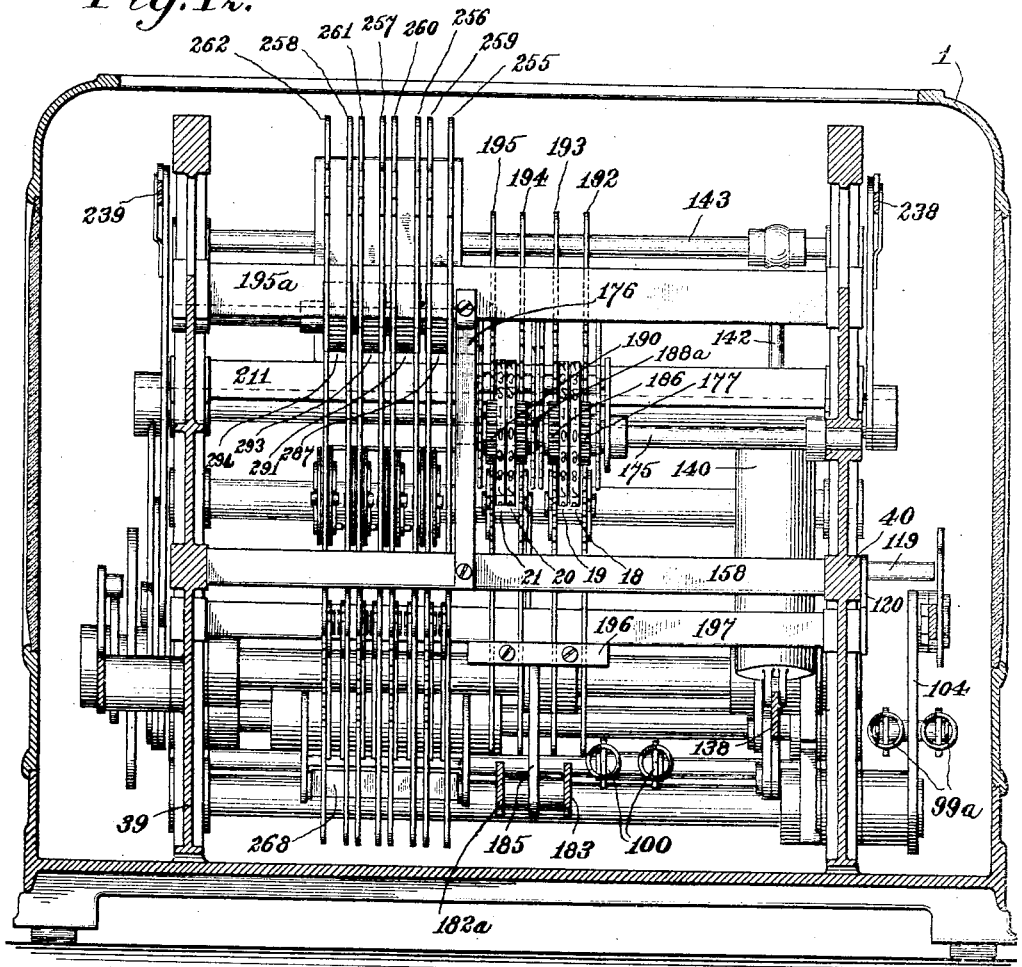
Fig. 12, is a transverse section on the line 12—12 of Fig. 5.

This is specially illustrated in Figs. 4, 8, 11, 33, 34 and 35. This consists of an endless ink ribbon band 144 which passes around the feed spool 145. (See Fig. 11). One side passes up through a guard plate 146, which has opening 147 through which a printing pad operates. Guard plate 146 is riveted to stripper plate 88. The ribbon then is carried up and over roller 151 which is journaled with roller 148 in bent metal piece 149 which is secured to spring tension piece 150 secured to stripper plate 88. (See Fig. 16).

From roller 151 the ribbon passes to the rear of the machine and around idler spool 152 which is mounted on plate 153 secured to tie bar 154 which connects side frames 39, 40. The ribbon then passes to the front end of the machine and down over roller 148 to guard plate 146, where it passes in front of opening 155 and then down to feed roller 145. The ribbon is moved in the direction of the arrow shown in Fig. 11. The mechanism for moving the ribbon step by step at each operation of the machine is as follows:

Feed roller 145 is mounted on a stud 156 which is supported by a plate 157 secured to cross bar 158.

Feed roller 145 has secured to its rear side a ratchet 159. Loosely mounted on stud 156 is an arm 160 which carries pawl 161 which is held in engagement with ratchet 159 by spring 162. Mounted integrally with arm 160 is a gear 163. Gear 163 meshes with gear 164 which is mounted on shaft 165 journaled in ears 166, 166 which are a part of plate 157. On shaft 165 is mounted lever 167 which coacts with arm 110 that carries pin 111 forming anchorage for return springs 100, 100. Lever 167 has an extension 168 forming a stop and also an arm which has spring 169 attached, the other end being fastened to cross bar 158.

A click pawl 170 mounted on plate 157 is provided and is held in engagement with ratchet 159 by spring 171. The parts are normally in the position shown in Fig. 34. When the handle 17 is pulled arm 110 is moved to the left. (See Fig. 34.) This allows spring 169 to move arm 167 until stop 168 comes against plate 159. Through the action of gears 164, 163, arm 160 is moved upwardly and the pawl 161 engages a new tooth. When the arm 110 returns to normal position it forces arm 167 backward into the position shown in Fig. 34 and the pawl 161 rotates the ratchet 159 and feed roller 145 forward one step. This mechanism feeds the ink ribbon forward one step at each operation of the machine.

*Printing mechanism.*

Figure 4:
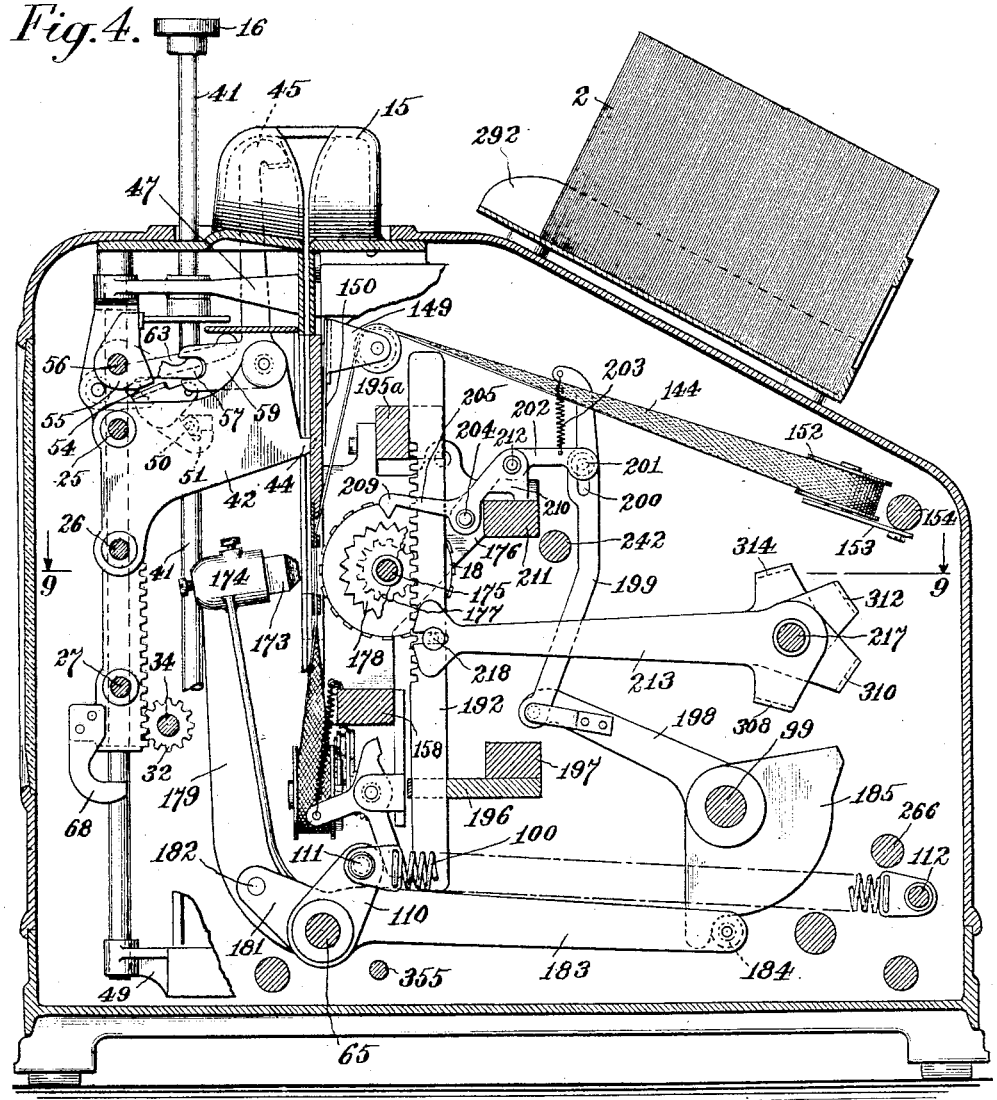
Fig. 4, is a sectional elevation taken on the line 4—4 of Fig. 9.
Figure 14:
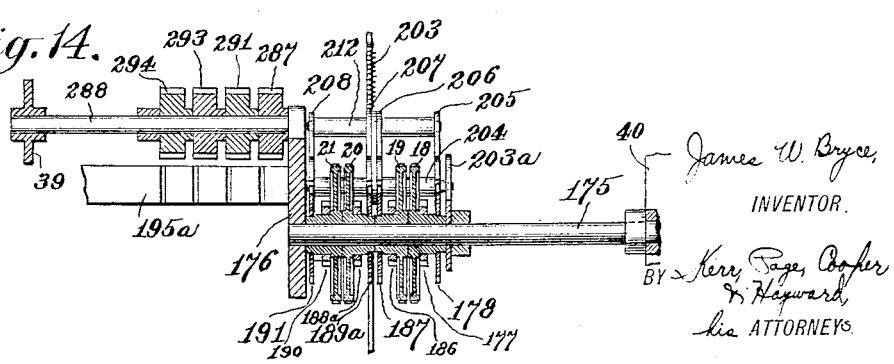
Fig. 14, is a detail sectional view showing the transfer pinions and the type-wheel mountings.
Figure 5:
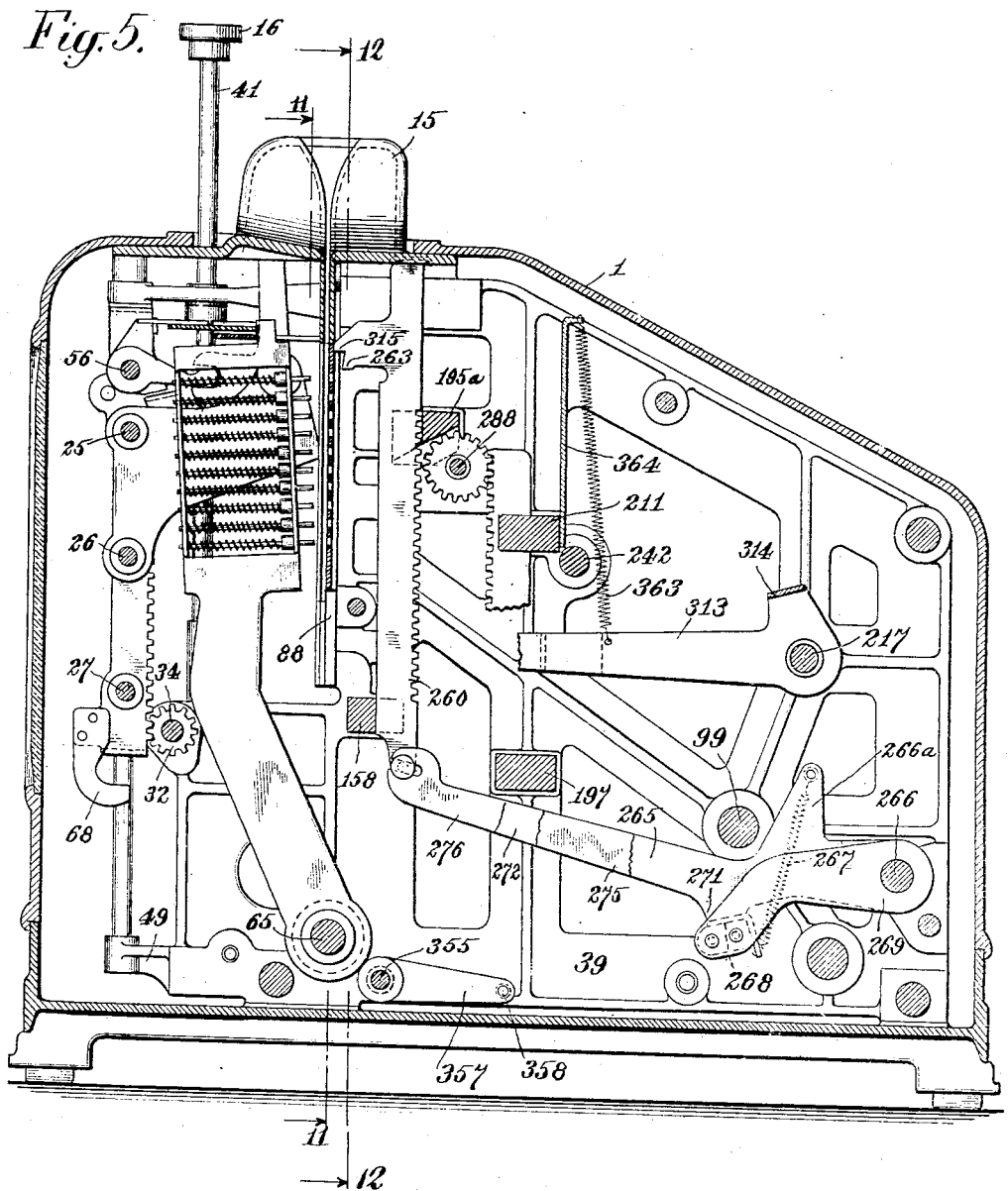
Fig. 5, is a sectional elevation taken on the line 5—5 of Fig. 9.

This is particularly illustrated in Figs. 4, 9 and 10.

It consists of two pressure printing pads 172, 173 supported in head 174. These printing pads 172, 173 coact with elapsed time type wheels 18, 19, 20, 21 (see Fig. 9) to print the condition of the type wheels on the record card 2.

The printing pads are adjustable for varying the pressure. The head 174 is supported on arm 179 which is loosely mounted on main shaft 65. Loosely mounted on main shaft 65 are two arms, 180, 181, which are rigidly secured to arm 179 by means of pin 182. Arms 180, 181, have rearwardly extending arms 182ª, 183, which at the rear end support roller, 184 which coacts with cam 185. Cam 185 is mounted upon main actuating shaft 99 and is so proportioned as to cause the printing pads to act at the latter end of the operation.

In the claims which follow, the novel features of the machine above specifically described, are defined and indicated.

I claim—

1. In an elapsed time calculating machine, the combination with a receiver for a card punched with holes which by their positions indicate different periods of time, of a pin box and series of pins carried thereby and movable toward the card so that such pins as register with perforations will pass through the card, time type wheels and differentially acting racks for adjusting the type-wheels according to the particular pins projecting through the card, means for operating the racks controlled solely by projecting pins and means for printing from the exposed portions of the wheels at a given point the elapsed time between the periods which the positions of the perforations in the card indicated.

2. In an elapsed time calculating machine, the combination with a receiver for a card punched with holes, which by their positions indicate different periods of time, of a plurality of pins movable toward the card so that such pins as register with perforations therein will pass through the card, time type wheels, differentially acting racks for adjusting the same to various positions according to the pins projecting through the card, means for operating the racks controlled solely by the projecting pins, means for printing from the type-wheels the elapsed time between the two periods indicated by the positions of the said perforations, a crank shaft for operating the above described means, and a flexible or yielding connection between the same and the means for adjusting the type-wheels.

3. In an elapsed time calculating machine, the combination with a receiver for a card punched with holes that by their positions indicate different periods of time, of a plurality of pins movable toward the card so that such pins as register with perforations therein will pass through the card, time type wheels, parts capable of differential movement to an extent determined by the projecting pins for adjusting the said type wheels, a printing mechanism for printing from the adjusted type-wheels the elapsed time between the periods which the positions of the perforations in the card indicate, and means adapted to be interposed in the path of movement of the printing mechanism when no pins project through the card and all of the parts movable through the paths of such pins travel to the limit of their movement without encountering any pins.

4. In a calculating machine the combinations with a series of time type-wheels of means for adjusting the same according to the positions of perforations in a workman's card, a crank shaft, flexible connections between the same and the type-wheel adjusting mechanism, and means for retarding the speed at which said crank can be operated so that the type-wheel adjusting mechanism may have ample time to perform its allotted functions.

5. In a calculating machine, the combination with a plurality of pins movable toward a receiver for a punched card so that the pins in register with perforations in the card will pass through the same, of time type-wheels, means for adjusting the same according to the pins which pass through the card, mechanism for printing from portions of the type-wheels exposed at a given point, impulse mechanism for operating the adjusting and printing mechanism and a flexible connection between the same and the adjusting mechanism operative during the first part of the movement of the impulse mechanism for performing the more delicate operations of type-wheel adjustment.

6. In a calculating machine the combination with a plurality of pins movable toward a receiver for a punched card so that the pins in register with perforatings in the card will pass through the same, of time type-wheels, means for adjusting the same according to the pins which pass through the card, mechanism for printing from portions of the type-wheels exposed at a given point, a crank shaft for supplying the power to operate the type-wheel adjusting and printing mechanisms, a spring connection between the same and the adjusting mechanism operative during the first part of the movement of the crank shaft and a positive connection between the latter and the printing mechanism operative during the latter part of the movement by the crank shaft for each operation of the machine.

7. In a calculating machine the combination with time type-wheels, means for adjusting the same according to the character of perforations in a workman's card, and means for printing from the said wheels when adjusted, of a crank shaft for supplying the power to operate the adjusting and the printing mechanisms, a main operating shaft operated thereby, a dash pot connected with and opposing the rotation of said shaft, and means for locking the shaft when its rate of movement exceeds that permitted by the dash pot.

8. In a calculating machine the combination with a plurality of pins and a holder therefor movable to and from a receiver for a punched workman's card, of a shaft for imparting movement to the pin holder and a toggle lever connection between the two whereby a mechanical advantage in moving the pins is gained and they remain in the position to which they are moved during each operation of the mechanism.

9. In a calculating machine the combination of a plurality of pins and a pin box in which they are spring supported, of a shaft for supplying power to move the pin box toward the receiver for a punched workman's card of a toggle lever connected with and operated by the shaft and a plate moved thereby when the shaft is rotated adapted to move the pin box toward the punched card.

10. In a calculating machine the combination with a pin box and a plurality of pins therein movable to and from a receiver for a punched workman's card, time typewheels, means for adjusting the same controlled entirely by those pins which project through the card, mechanism for printing from the type-wheels, a crank handle mounted on a shaft, a main operating shaft, connections between the same and the crank shaft and between the same and the pin box, the type-wheel adjusting means and the printing mechanism.

In testimony whereof I affix my signature in the presence of two subscribing witnesses.

JAMES W. BRYCE.

Witnesses:
THOMAS J. BYRNE,
HUGO B. POLSON.

Copies of this patent may be obtained for five cents each, by addressing the "Commissioner of Patents, Washington, D. C."